US011228476B2

United States Patent
Yamada et al.

(10) Patent No.: US 11,228,476 B2
(45) Date of Patent: Jan. 18, 2022

(54) BASE STATION APPARATUS, TERMINAL APPARATUS, AND COMMUNICATION METHOD

(71) Applicants: SHARP KABUSHIKI KAISHA, Sakai (JP); FG Innovation Company Limited, New Territories (HK)

(72) Inventors: Ryota Yamada, Sakai (JP); Hiromichi Tomeba, Sakai (JP); Hideo Namba, Sakai (JP); Atsushi Shirakawa, Sakai (JP)

(73) Assignees: SHARP KABUSHIKI KAISHA, Sakai (JP); FG INNOVATION COMPANY LIMITED, Tuen Mun (HK)

( * ) Notice: Subject to any disclaimer, the term of this patent is extended or adjusted under 35 U.S.C. 154(b) by 0 days.

(21) Appl. No.: 16/954,519

(22) PCT Filed: Nov. 8, 2018

(86) PCT No.: PCT/JP2018/041484
§ 371 (c)(1),
(2) Date: Jun. 17, 2020

(87) PCT Pub. No.: WO2019/130847
PCT Pub. Date: Jul. 4, 2019

(65) Prior Publication Data
US 2020/0336355 A1    Oct. 22, 2020

(30) Foreign Application Priority Data

Dec. 26, 2017  (JP) ............................. JP2017-249045

(51) Int. Cl.
*H04L 27/26*    (2006.01)
*H04B 7/06*    (2006.01)
(Continued)

(52) U.S. Cl.
CPC ............ *H04L 27/2649* (2013.01); *H04B 7/06* (2013.01); *H04J 13/16* (2013.01); *H04W 92/10* (2013.01)

(58) Field of Classification Search
None
See application file for complete search history.

(56) References Cited

U.S. PATENT DOCUMENTS 10,523,289 B2 * 12/2019 Yamada ............... H04J 11/0073
10,841,058 B2 * 11/2020 Zhang .................. H04L 5/0048
(Continued)

FOREIGN PATENT DOCUMENTS

WO    2016/127309 A1    8/2016

OTHER PUBLICATIONS

"IMT Vision—Framework and overall objectives of the future development of IMT for 2020 and beyond", M Series Mobile, radiodetermination, amateur and related satellite services, Recommendation ITU-R M.2083-0, Sep. 2015.
(Continued)

*Primary Examiner* — Bob A Phunkulh
(74) *Attorney, Agent, or Firm* — Polsinelli

(57) ABSTRACT

A terminal apparatus for communicating with a base station apparatus, the terminal apparatus including: a receiver configured to receive downlink control information and a downlink shared channel; and a signal detection unit configured to demodulate the downlink shared channel (PDSCH) by using the downlink control information, wherein the downlink control information includes information for indicating an antenna port number and the number of code division multiplexing (CDM) groups for a demodulation reference signal (DMRS), each of the CDM groups indicates a DMRS port to be multiplexed by CDM, the PDSCH is demodulated in consideration of a power ratio of the DMRS and the
(Continued)

PDSCH, and whether or not to consider powers of the DMRS and the PDSCH, based on the number of the CDM groups, is determined based on the downlink control information.

8 Claims, 5 Drawing Sheets

(51) Int. Cl.
*H04J 13/16* (2011.01)
*H04W 92/10* (2009.01)

(56) References Cited

U.S. PATENT DOCUMENTS

| | | | |
|---|---|---|---|
| 2013/0034070 A1* | 2/2013 | Seo | H04L 5/0082 370/329 |
| 2014/0016565 A1* | 1/2014 | Ode | H04J 11/0053 370/328 |
| 2015/0223216 A1* | 8/2015 | Han | H04W 72/044 370/329 |
| 2016/0020879 A1* | 1/2016 | Shimezawa | H04W 72/04 370/329 |
| 2016/0020882 A1* | 1/2016 | Shimezawa | H04L 27/2613 370/330 |
| 2016/0028521 A1* | 1/2016 | Shimezawa | H04J 11/005 370/329 |
| 2016/0127102 A1* | 5/2016 | Kim | H04L 5/0051 370/330 |
| 2016/0227521 A1* | 8/2016 | Han | H04L 5/0051 |
| 2018/0048372 A1* | 2/2018 | Sun | H04B 7/0639 |
| 2018/0278391 A1* | 9/2018 | Zhang | H04L 5/0053 |
| 2019/0158206 A1* | 5/2019 | Li | H04J 13/0048 |
| 2020/0396047 A1* | 12/2020 | Gao | H04L 5/0094 |

OTHER PUBLICATIONS

E. G. Larsson et al., "Massive MIMO for next generation wireless systems", IEEE Communications Magazine Feb. 2014, pp. 186-195.

* cited by examiner

BASE STATION APPARATUS, TERMINAL APPARATUS, AND COMMUNICATION METHOD

TECHNICAL FIELD

The present invention relates to a base station apparatus, a terminal apparatus, and a communication method.

This application claims priority based on JP 2017-249045 filed on Dec. 26, 2017, the contents of which are incorporated herein by reference.

BACKGROUND ART

Research and development activities related to the 5th generation mobile radio communication system (5G system) have been actively carried out, aiming to start commercial services around the year 2020. A vision recommendation on the standard system of the 5G system (International mobile telecommunication—2020 and beyond: IMT-2020) was recently reported (see NPL 1) by the International Telecommunication Union Radio communications Sector (ITU-R), which is an international standardization body (see NPL 1).

For communication systems to address rapid increase of data traffic, ensuring frequency resources is an important challenge. Therefore, in 5G, it is one of the targets to achieve ultra high capacity communications by using higher frequency bands than the frequency bands used in Long term evolution (LTE).

However, in radio communication using high frequency bands, path loss is a problem. Beamforming by multiple antennas is a promising technique in order to compensate for path loss (see NPL 2).

CITATION LIST

Non Patent Literature

NPL 1: "IMT Vision—Framework and overall objectives of the future development of IMT for 2020 and beyond," Recommendation ITU-R M. 2083-0, September 2015.

NPL 2: E. G. Larsson, O. Edfors, F. Tufvesson, and T. L. Marzetta, "Massive MIMO for next generation wireless system," IEEE Commun. Mag., vol. 52, no. 2, pp. 186-195, February 2014.

SUMMARY OF INVENTION

Technical Problem

However, in beamforming especially in high frequency bands, reliability, frequency utilization efficiency, or throughput may be problematic, since cutoff of a channel may be caused due to blocking by a person or an object, or communication becomes low rank communication, for example, due to high spatial correlation by Line of Sight (LOS) environments.

An aspect of the present invention has been made in view of such circumstances, and an object of the present invention is to provide a base station apparatus, a terminal apparatus, and a communication method capable of improving reliability, frequency utilization efficiency, or throughput in a case that a base station apparatus or a terminal apparatus performs beamforming transmission.

Solution to Problem

To address the above-mentioned drawbacks, a base station apparatus, a terminal apparatus, and a communication method according to an aspect of the present invention are configured as follows.

A terminal apparatus according to an aspect of the present invention is a terminal apparatus for communicating with a base station apparatus, the terminal apparatus including: a receiver configured to receive downlink control information and a downlink shared channel; and a signal detection unit configured to demodulate the downlink shared channel (PDSCH) by using the downlink control information, wherein the downlink control information includes information for indicating an antenna port number and the number of code division multiplexing (CDM) groups for a demodulation reference signal (DMRS), each of the CDM groups indicates a DMRS port to be multiplexed by CDM, the PDSCH is demodulated in consideration of a power ratio of the DMRS and the PDSCH, and whether or not to consider powers of the DMRS and the PDSCH, based on the number of the CDM groups, is determined based on the downlink control information.

In the terminal apparatus according to an aspect of the present invention, the downlink control information includes information for indicating whether or not to consider the powers of the DMRS and the PDSCH, based on the number of the CDM groups.

The terminal apparatus according to an aspect of the present invention includes a higher layer processing unit configured to be configured with a DMRS port group 1 and a DMRS port group 2 by radio resource control (RRC), wherein in a case that each of the DMRS port associated with the DMRS port group 1 and the DMR port associated with the DMRS port group 2 is a DMRS port belonging to a different CDM group of the CDM groups, the PDSCH is demodulated with a power ratio of the DMRS and the PDSCH being one.

The terminal apparatus according to an aspect of the present invention includes a higher layer processing unit configured to be configure with a DMRS port group 1 and a DMRS port group 2 by radio resource control (RRC), wherein the downlink control information includes a transmit configuration indicator (TCI) for indicating a relationship between a reference signal and a DMRS port group, and in a case that the TCI includes a configuration related to the DMRS port group 1 and the DMRS port 2, the PDSCH is demodulated with the power ratio of the DMRS and the PDSCH being one.

In the terminal apparatus according to an aspect of the present invention, the downlink control information includes information for indicating a scrambling identity (SCID) of a sequence of the DMRS, and whether or not to consider the powers of the DMRS and the PDSCH, based on the number of the CDM groups, is determined depending on a value of the SCID.

A base station apparatus according to an aspect of the present invention is a base station apparatus for communicating with a terminal apparatus, the base station apparatus including: a reference signal generation unit configured to generate a demodulation reference signal; and a transmitter configured to transmit the demodulation reference signal, downlink control information, and a downlink shared channel, wherein the downlink control information includes information for indicating an antenna port number and the number of code division multiplexing (CDM) groups without data for a demodulation reference signal (DMRS), each of the CDM groups indicates a DMRS port to be multiplexed by CDM, and the downlink control information includes information for indicating whether or not to consider powers of the DMRS and a PDSCH, based on the number of the CDM groups.

A communication method according to an aspect of the present invention is a communication method for a terminal apparatus for communicating with a base station apparatus, the communication method including the steps of: receiving downlink control information and a downlink shared channel; and demodulating the downlink shared channel (PDSCH) by using the downlink control information, wherein the downlink control information includes information for indicating an antenna port number and the number of code division multiplexing (CDM) groups for a demodulation reference signal (DMRS), each of the CDM groups indicates a DMRS port to be multiplexed by CDM, the PDSCH is demodulated in consideration of a power ratio of the DMRS and the PDSCH, and whether or not to consider powers of the DMRS and the PDSCH, based on the number of the CDM groups, is determined based on the downlink control information.

A communication method according to an aspect of the present invention is a communication method for a base station apparatus for communicating with a terminal apparatus, the communication method including the steps of: generating a demodulation reference signal; and transmitting the demodulation reference signal, downlink control information, and a downlink shared channel, wherein the downlink control information includes information for indicating an antenna port number and the number of code division multiplexing (CDM) groups without data for a demodulation reference signal (DMRS), each of the CDM groups indicates a DMRS port to be multiplexed by CDM, and the downlink control information includes information for indicating whether or not to consider powers of the DMRS and a PDSCH, based on the number of the CDM groups.

Advantageous Effects of Invention

According to an aspect of the present invention, by beamforming communication at a base station apparatus or a terminal apparatus, reliability, frequency utilization efficiency, or throughput can be improved.

DESCRIPTION OF EMBODIMENTS

A communication system according to the present embodiment includes a base station apparatus (transmitting apparatus, cell, transmission point, group of transmit antennas, group of transmit antenna ports, component carrier, eNodeB, transmission point, transmission and/or reception point, transmission panel, access point, or subarray) and a terminal apparatus (terminal, mobile terminal, reception point, receiving terminal, receiving apparatus, group of receive antennas, group of receive antenna ports, UE, reception point, reception panel, station, or subarray). A base station apparatus connected to a terminal apparatus (base station apparatus that establishes a radio link with a terminal apparatus) is referred to as a serving cell.

A base station apparatus and a terminal apparatus in the present embodiment can communicate in licensed bands and/or unlicensed bands.

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
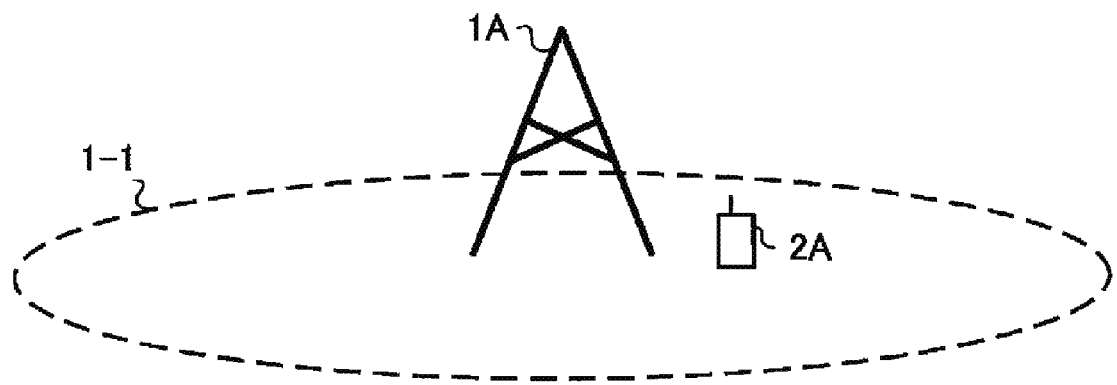
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and a terminal apparatus 2A. A coverage 1-1 is a range (a communication area) in which the base station apparatus 1A can connect to terminal apparatuses. The base station apparatus 1A is also simply referred to as a base station apparatus. The terminal apparatus 2A is simply referred to as a terminal apparatus.

In FIG. 1, the following uplink physical channels are used for uplink radio communication from the terminal apparatus 2A to the base station apparatus 1A. The uplink physical channels are used for transmitting information output from higher layers.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes a positive acknowledgement (ACK) or a negative acknowledgement (NACK) (ACK/NACK) for downlink data (downlink transport blocks or the Downlink-Shared Channel (DL-SCH)). The ACK/NACK for downlink data is also referred to as HARQ-ACK or HARQ feedback.

The uplink control information includes Channel State Information (CSI) for the downlink. The uplink control information includes a Scheduling Request (SR) used to request an Uplink-Shared Channel (UL-SCH) resource. The channel state information refers to a Rank Indicator (RI) for specifying a preferable number of spatial multiplexing, a Precoding Matrix Indicator (PMI) for specifying a preferable precoder, a Channel Quality Indicator (CQI) for specifying a preferable transmission rate, a CSI-Reference Signal (RS) Resource Indicator (CRI) for indicating a preferable CSI-RS resource, a Reference Signal Received Power (RSRP) measured by a CSI-RS or a Synchronization Signal (SS), and the like.

The channel quality indicator (CQI) (hereinafter, referred to as a CQI value) can be a preferable modulation scheme (e.g., QPSK, 16QAM, 64QAM, 256QAM, or the like) or a coding rate in a prescribed band (details of which will be described later). The CQI value can be an index (CQI Index) determined by the change scheme or coding rate. The CQI value can take a value predetermined in the system.

The CRI indicates a CSI-RS resource whose received power/reception quality is preferable from multiple CSI-RS resources.

Note that the rank indicator and the precoding quality indicator can take values predetermined in the system. The rank indicator and the precoding matrix indicator can be indexes determined by the number of spatial multiplexing or precoding matrix information. Note that some or all of the CQI value, the PMI value, the RI value, and the CRI value are also collectively referred to as a "CSI value".

The PUSCH is used to transmit uplink data (uplink transport block, UL-SCH). The PUSCH may be used to transmit ACK/NACK and/or channel state information together with uplink data. The PUSCH may be used to transmit uplink control information only.

The PUSCH is used to transmit an RRC message. The RRC message is information/signal that is processed in the Radio Resource Control (RRC) layer. The PUSCH is used to transmit a MAC Control Element (CE). Here, the MAC CE is information/signal that is processed (transmitted) in the Medium Access Control (MAC) layer.

For example, a power headroom may be included in a MAC CE and may be reported via the PUSCH. In other words, a MAC CE field may be used to indicate a level of a power headroom.

The PRACH is used to transmit a random access preamble.

In the uplink radio communication, an Uplink Reference Signal (UL RS) is used as an uplink physical signal. The uplink physical signal is not used to transmit information output from higher layers, but is used by the physical layer. The uplink reference signal includes a Demodulation Reference Signal (DMRS), a Sounding Reference Signal (SRS), and a Phase-Tracking reference signal (PT-RS).

The DMRS is associated with transmission of the PUSCH or the PUCCH. For example, the base station apparatus 1A uses the DMRS in order to perform channel compensation of the PUSCH or the PUCCH. For example, the base station apparatus 1A uses the SRS to measure a channel state of uplink. The SRS is used for uplink observation (sounding). The PT-RS is used to compensate for phase noise. Note that a DMRS for uplink is also referred to as an uplink DMRS.

In FIG. 1, the following downlink physical channels are used for downlink radio communication from the base station apparatus 1A to the terminal apparatus 2A. The downlink physical channels are used for transmitting information output from higher layers.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)

The PBCH is used for broadcasting a Master Information Block (MIB, Broadcast Channel (BCH)) that is used commonly by the terminal apparatuses. The PCFICH is used to transmit information for indicating a region (e.g., the number of Orthogonal Frequency Division Multiplexing (OFDM) symbols) used for transmission of the PDCCH. Note that the MIB is also referred to as minimum system information.

The PHICH is used to transmit ACK/NACK for uplink data (transport block, codeword) received by the base station apparatus 1A. In other words, the PHICH is used to transmit a HARQ indicator (HARQ feedback) for indicating ACK/NACK for uplink data. The ACK/NACK is also called HARQ-ACK. The terminal apparatus 2A reports ACK/NACK received to higher layers. The ACK/NACK is ACK for indicating a successful reception, NACK for indicating an unsuccessful reception, or DTX for indicating that no corresponding data is present. In a case that the PHICH for uplink data is not present, the terminal apparatus 2A reports ACK to higher layers.

The PDCCH and the EPDCCH are used to transmit Downlink Control Information (DCI). Here, multiple DCI formats are defined for transmission of the downlink control information. To be more specific, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information on PDSCH resource allocation, information on a Modulation and Coding Scheme (MCS) for the PDSCH, and a TPC command for the PUCCH. Here, the DCI format for the downlink is also referred to as downlink grant (or downlink assignment).

For example, as a DCI format for the uplink, DCI format 0 to be used for the scheduling of one PUSCH in one cell (transmission of a single uplink transport block) is defined.

For example, the DCI format for the uplink includes uplink control information such as information on PUSCH resource allocation, information on an MCS for the PUSCH, and a TPC command for the PUSCH. The DCI format for the uplink is also referred to as uplink grant (or uplink assignment).

The DCI format for the uplink can be used to request Channel State Information (CSI, also referred to as reception quality information) for the downlink (CSI request).

The DCI format for the uplink can be used for configuration for indicating an uplink resource to which a channel state information report (CSI feedback report) is mapped, the channel state information report being fed back to the base station apparatus by the terminal apparatus. For example, the channel state information report can be used for configuration for indicating an uplink resource that periodically reports channel state information (Periodic CSI). The channel state information report can be used for mode configuration (CSI report mode) for periodically reporting the channel state information.

For example, the channel state information report can be used for configuration for indicating an uplink resource that reports aperiodic channel state information (Aperiodic CSI). The channel state information report can be used for mode configuration (CSI report mode) for aperiodically reporting the channel state information.

For example, the channel state information report can be used for configuration for indicating an uplink resource that reports semi-persistent channel state information (semi-persistent CSI). The channel state information report can be used for mode configuration (CSI report mode) for semi-persistently reporting the channel state information. Note that the semi-persistent CSI report is to periodically perform CSI report during a period since activated with higher layer signaling or downlink control information until deactivated.

DCI formats for the uplink can be used for configuration for indicating types of channel state information report that is fed back to the base station apparatus by the terminal apparatus. The types of channel state information report include wideband CSI (e.g., Wideband CQI), narrowband CSI (e.g., Subband CQI), and the like.

In a case that a PDSCH resource is scheduled in accordance with downlink assignment, the terminal apparatus receives downlink data on the scheduled PDSCH. In a case that a PUSCH resource is scheduled in accordance with uplink grant, the terminal apparatus transmits uplink data and/or uplink control information on the scheduled PUSCH.

The PDSCH is used to transmit downlink data (downlink transport block, DL-SCH). The PDSCH is used to transmit a system information block type 1 message. The system information block type 1 message is cell-specific information.

The PDSCH is used to transmit system information messages. The system information messages include system information blocks X other than the system information block type 1. The system information messages are cell-specific information.

The PDSCH is used to transmit an RRC message. Here, the RRC message transmitted from the base station apparatus may be common to multiple terminal apparatuses in the cell. The RRC message transmitted from the base station apparatus 1A may be a dedicated message to a certain terminal apparatus 2A (also referred to as dedicated signaling). In other words, user equipment-specific information is transmitted by using a message dedicated to a certain terminal apparatus. The PDSCH is used to transmit MAC CE.

Here, the RRC message and/or MAC CE is also referred to as higher layer signaling.

The PDSCH can be used to request downlink channel state information. The PDSCH can be used to transmit an uplink resource to which a channel state information report (CSI feedback report) is mapped, the channel state information report being fed back to the base station apparatus by the terminal apparatus. For example, the channel state information report can be used for configuration for indicating an uplink resource that periodically reports channel state information (Periodic CSI). The channel state information report can be used for mode configuration (CSI report mode) for periodically reporting the channel state information.

Types of downlink channel state information report include wideband CSI (e.g., Wideband CSI) and narrowband CSI (e.g., Subband CSI). The wideband CSI calculates one piece of channel state information for the system band of the cell. The narrowband CSI divides the system band in prescribed units, and calculates one piece of channel state information for each division.

In the downlink radio communication, a Synchronization signal (SS) and a Downlink Reference Signal (DL RS) are used as downlink physical signals. The downlink physical signals are not used to transmit information output from higher layers, but are used by the physical layer. Note that synchronization signals include Primary Synchronization Signal (PSS) and Secondary Synchronization Signal (SSS).

A synchronization signal is used for the terminal apparatus to take synchronization in the frequency domain and the time domain in the downlink. The synchronization signal is also used to measure a received power, a reception quality, or a Signal-to-Interference and Noise power Ratio (SINR). Note that the received power measured by the synchronization signal is also referred to as a Synchronization Signal-Reference Signal Received Power (SS-RSRP), the reception quality measured by the synchronization signal is also referred to as a Reference Signal Received Quality (SS-RSRQ), and the SINR measured by the synchronization signal is also referred to as an SS-SINR. Note that the SS-RSRQ is a ratio between the SS-RSRP and an RSSI. The Received Signal Strength Indicator (RSSI) is the total average received power in a certain observation period. The synchronization signal/downlink reference signal is used for the terminal apparatus to perform channel compensation on a downlink physical channel. For example, the synchronization signal/downlink reference signal is used for the terminal apparatus to calculate the downlink channel state information.

Here, downlink reference signals include a Demodulation Reference Signal (DMRS), a Non-Zero Power Channel State Information-Reference Signal (NZP CSI-RS), a Zero Power Channel State Information-Reference Signal (ZP CSI-RS), a PT-RS, and a Tracking Reference Signal (TRS). Note that a DMRS for downlink is also referred to as a downlink DMRS. Note that in a case of simply referring to a CSI-RS, it includes the NZP CSI-RS and/or the ZP CSI-RS in the following embodiments.

The DMRS is transmitted in a subframe and a band used for transmission of the PDSCH/PBCH/PDCCH/EPDCCH associated with the DMRS, and is used to demodulate the PDSCH/PBCH/PDCCH/EPDCCH associated with the DMRS.

A resource for the NZP CSI-RS is configured by the base station apparatus 1A. For example, the terminal apparatus 2A performs signal measurement (channel measurement) or interference measurement by using the NZP CSI-RS. The NZP CSI-RS is used for beam scanning seeking a preferable beam direction, beam recovery for recovering in a case that a received power/reception quality in a beam direction deteriorates, or the like. A resource for the ZP CSI-RS is configured by the base station apparatus 1A. The base station apparatus 1A transmits the ZP CSI-RS with zero output. For example, the terminal apparatus 2A performs interference measurement in a resource corresponding to the ZP CSI-RS. Note that the resource corresponding to the ZP CSI-RS for interference measurement is also referred to as a CSI-Interference Measurement (IM) resource.

The base station apparatus 1A transmits (configures) an NZP CSI-RS resource configuration for the resource of the NZP CSI-RS. The NZP CSI-RS resource configuration includes some or all of one or more NZP CSI-RS resource mappings, CSI-RS resource configuration ID for each NZP CSI-RS resource, and the number of antenna ports. The CSI-RS resource mapping is an OFDM symbol in a slot in which a CSI-RS resource is allocated, and information for indicating a subcarrier (e.g., a resource element). The CSI-RS resource configuration ID is used to identify an NZP CSI-RS resource.

The base station apparatus 1A transmits (configures) a CSI-IM resource configuration. The CSI-IM resource configuration includes one or more CSI-IM resource mappings, and a CSI-IM resource configuration ID for each CSI-IM resource. The CSI-IM resource mapping is an OFDM symbol in a slot in which a CSI-IM resource is allocated, and information for indicating a subcarrier (e.g., a resource element). The CSI-IM resource configuration ID is used to identify a CSI-IM configuration resource.

The CSI-RS is used to measure a received power, a reception quality, or an SINR. The received power measured by the CSI-RS is referred to as a CSI-RSRP, the reception quality measured by the CSI-RS is referred to as a CSI-RSRQ, and the SINR measured by the CSI-RS is also referred to as a CSI-SINR. Note that the CSI-RSRQ is a ratio between the CSI-RSRP and the RSSI.

The CSI-RS is transmitted periodically/non-periodically/semi-permanently.

The terminal apparatus is configured by higher layers with respect to CSI. For example, there are a report configuration that is a configuration of CSI report, a resource configuration that is a configuration of a resource for measuring CSI, and a measurement link configuration for linking a report configuration and a resource configuration for CSI measurement. One or multiple report configurations, resource configurations, and measurement link configurations are configured.

The report configuration includes some or all of a report configuration ID, a report configuration type, a codebook configuration, a CSI report amount, and a block error rate target. The report configuration ID is used to identify a report configuration. The report configuration type indicates a periodic/non-periodic/semi-persistent CSI report. The CSI report amount indicates a reported amount (value, type), e.g., some or all of CRI, RI, PMI, CQI, or RSRP. The block error rate target is a target of block error rate that is assumed in a case of computing a CQI.

The resource configuration includes some or all of a resource configuration ID, a synchronization signal block resource measurement list, a resource configuration type, and one or more resource set configurations. The resource configuration ID is used to identify a resource configuration. The synchronization signal block resource configuration list is a list of resources for which measurements are made by using synchronization signals. The resource configuration type indicates whether a CSI-RS is transmitted periodically, non-periodically, or semi-permanently. Note that in the case of a configuration in which a CSI-RS is transmitted semi-permanently, a CSI-RS is periodically transmitted during a period since activated with higher layer signaling or downlink control information until deactivated.

The resource set configuration includes some or all of a resource set configuration ID, resource repetition, or information for indicating one or more CSI-RS resources. The resource set configuration ID is used to identify a resource set configuration. The resource repetition indicates ON/OFF of resource repetition in the resource set. In a case that the resource repetition is ON, it means that the base station apparatus uses a fixed (identical) transmit beam in each of multiple CSI-RS resources in the resource set. In other words, in the case that the resource repetition is ON, the terminal apparatus assumes that the base station apparatus uses fixed (identical) transmit beam in each of multiple CSI-RS resources in the resource set. In a case that the resource repetition is OFF, it means that the base station apparatus does not use a fixed (identical) transmit beam in each of multiple CSI-RS resources in the resource set. In other words, in the case that the resource repetition is OFF, the terminal apparatus assumes that the base station apparatus does not use a fixed (identical) transmit beam in each of multiple CSI-RS resources in the resource set. The information for indicating CSI-RS resources includes one or more CSI-RS resource configuration IDs, or one or more CSI-IM resource configuration IDs.

The measurement link configuration includes some or all of a measurement link configuration ID, a report configuration ID, and a resource configuration ID, in which the report configuration and the resource configuration are linked. The measurement link configuration ID is used to identify a measurement link configuration.

A Multimedia Broadcast multicast service Single Frequency Network (MBSFN) RS is transmitted in the entire band of a subframe used for transmission of the PMCH. The MBSFN RS is used to demodulate the PMCH. The PMCH is transmitted through antenna ports used for transmission of the MBSFN RS.

Here, the downlink physical channels and the downlink physical signals are also collectively referred to as downlink signals. The uplink physical channels and the uplink physical signals are also collectively referred to as uplink signals. The downlink physical channels and the uplink physical channels are also collectively referred to as physical channels. The downlink physical signals and the uplink physical signals are also collectively referred to as physical signals.

The BCH, the UL-SCH, and the DL-SCH are transport channels. Channels used in the Medium Access Control (MAC) layer are referred to as transport channels. A unit of the transport channels used in the MAC layer is also referred to as a Transport Block (TB) or a MAC Protocol Data Unit (PDU). The transport block is a unit of data that the MAC layer delivers to the physical layer. In the physical layer, the transport block is mapped to codewords, and coding processing and the like are performed for each codeword.

For terminal apparatuses that support Carrier Aggregation (CA), a base station apparatus can integrate multiple Component Carriers (CCs) for transmission in a broader band to perform communication. In carrier aggregation, one Primary Cell (PCell) and one or more Secondary Cells (SCells) are configured as a group of serving cells.

In Dual Connectivity (DC), a Master Cell Group (MCG) and a Secondary Cell Group (SCG) are configured as a group of serving cells. The MCG includes a PCell and optionally one or more SCells. The SCG includes a primary SCell (PSCell) and optionally one or more SCells.

A base station apparatus can communicate by using a radio frame. The radio frame includes multiple subframes (sub-periods). In a case that a frame length is expressed in time, for example, a radio frame length can be 10 milliseconds (ms), and a subframe length can be 1 ms. In this example, the radio frame includes 10 subframes.

A slot includes 14 OFDM symbols. Since the OFDM symbol length can vary depending on the subcarrier spacing, the slot length can also vary depending on the subcarrier spacing. A mini-slot includes OFDM symbols fewer than a slot. The slot/mini-slot can be used as a scheduling unit. Note that a terminal apparatus can know slot based scheduling/mini-slot based scheduling depending on the position (mapping) of a first downlink DMRS. In the slot based scheduling, the first downlink DMRS is allocated to the third or the fourth symbol of the slot. In the mini-slot based scheduling, the first downlink DMRS is allocated to the first symbol of the scheduled data (resource, PDSCH).

A resource block is defined by 12 continuous subcarriers. A resource element is defined by an index of the frequency domain (e.g., a subcarrier index) and an index of the time domain (e.g., an OFDM symbol index). Resource elements are classified as uplink resource elements, downlink elements, flexible resource elements, and reserved resource elements. In the reserved resource elements, the terminal apparatus does not transmit uplink signals and does not receive downlink signals.

Multiple subcarrier spacings (SCSs) are supported. For example, SCS is 15/30/60/120/240/480 kHz.

A base station apparatus/terminal apparatus can communicate in a licensed band or an unlicensed band. The base station apparatus/terminal apparatus can communicate in a licensed band serving as the PCell, and by using carrier aggregation with at least one SCell operating in an unlicensed band. The base station apparatus/terminal apparatus can communicate in dual connectivity in which the master cell group communicates with a licensed band and the secondary cell group communicates with an unlicensed band. The base station apparatus/terminal apparatus can communicate in an unlicensed band by the PCell only. The base station apparatus/terminal apparatus can communicate in CA or DC in an unlicensed band only. Note that communicating with a licensed band serving as the PCell, and assisting a cell of an unlicensed band (SCell, PSCell) by, for example, CA, DC, or the like, is also referred to as a Licensed-Assisted Access (LAA). The communicating of the base station apparatus/terminal apparatus only in an unlicensed band is also referred to as Unlicensed-standalone access (ULSA). The communication of the base station apparatus/terminal apparatus only in a licensed band is also referred to as Licensed Access (LA).

Figure 2:
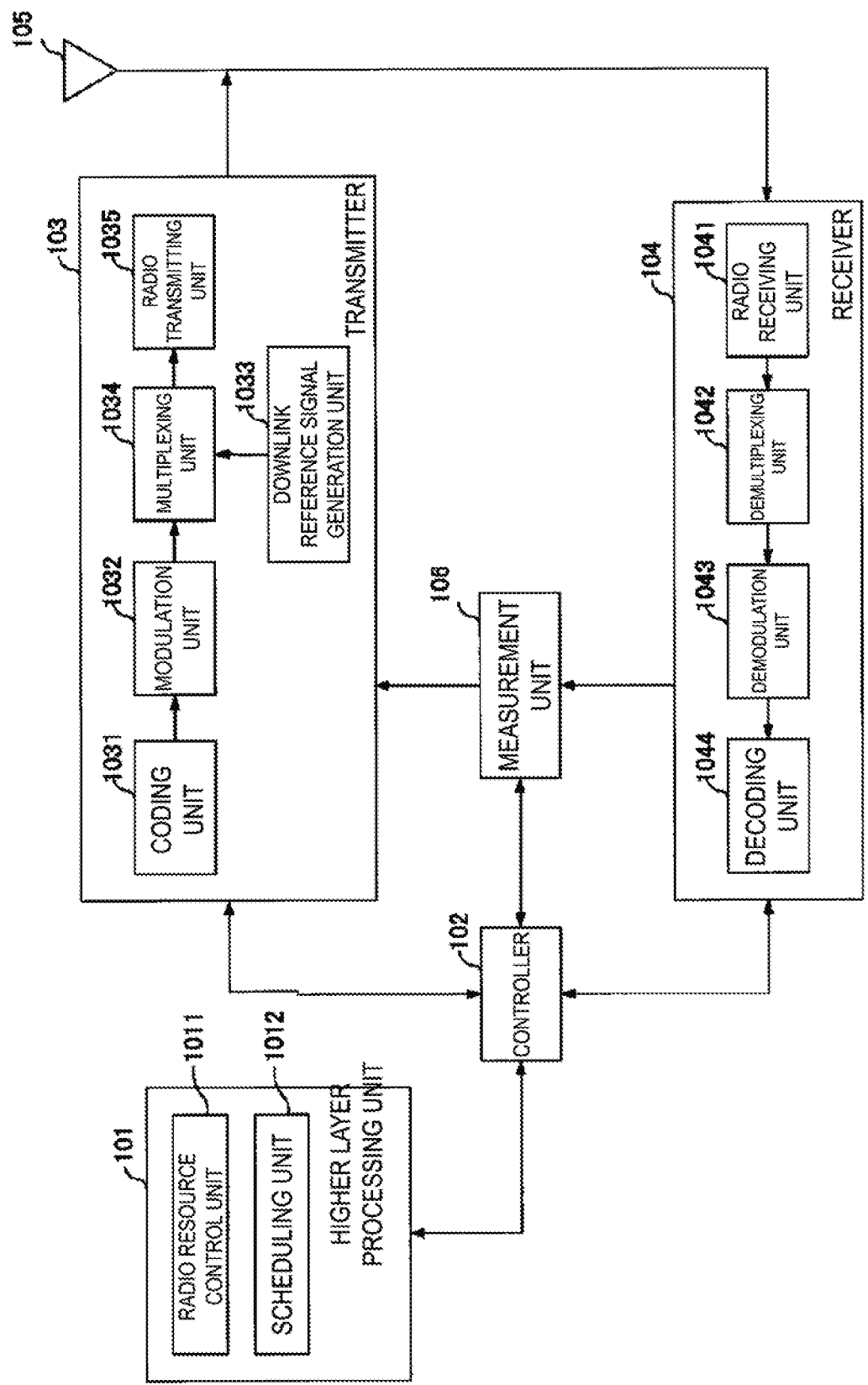
FIG. 2 is a block diagram illustrating an example configuration of a base station apparatus according to the present embodiment.

FIG. 2 is a schematic block diagram illustrating a configuration of a base station apparatus according to the present embodiment. As illustrated in FIG. 2, the base station apparatus includes a higher layer processing unit (higher layer processing step) 101, a controller (controlling step) 102, a transmitter (transmitting step) 103, a receiver (receiving step) 104, a transmit and/or receive antenna 105, and a measurement unit (measuring step) 106. The higher layer processing unit 101 includes a radio resource control unit (radio resource controlling step) 1011 and a scheduling unit (scheduling step) 1012. The transmitter 103 includes a coding unit (coding step) 1031, a modulation unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 includes a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. The higher layer processing unit 101 generates information necessary for control of the transmitter 103 and the receiver 104, and outputs the generated information to the controller 102.

The higher layer processing unit 101 receives information on a terminal apparatus, such as capability of the terminal apparatus (UE capability), from the terminal apparatus. In other words, the terminal apparatus transmits its functions to the base station apparatus by higher layer signaling.

Note that in the following description, information on a terminal apparatus includes information for indicating whether or not the terminal apparatus supports a prescribed function, or information for indicating that the terminal apparatus has completed the introduction and test of a prescribed function. In the following description, whether a prescribed function is supported or not includes whether the introduction and test of the prescribed function have been completed.

For example, in a case that a terminal apparatus supports a prescribed function, the terminal apparatus transmits information (parameters) for indicating whether or not the prescribed function is supported. In a case that a terminal apparatus does not support a prescribed function, the terminal apparatus does not transmit information (parameters) for indicating whether or not the prescribed function is supported. In other words, whether the prescribed function is supported is notified by whether or not information (parameters) for indicating whether the prescribed function is supported is transmitted. The information (parameters) for indicating whether or not a prescribed function is supported may be notified by using one bit of 1 or 0.

The radio resource control unit 1011 generates, or acquires from a higher node, downlink data (transport block) to be allocated in the downlink PDSCH, system information, an RRC message, a MAC CE, and the like. The radio resource control unit 1011 outputs the downlink data to the transmitter 103, and outputs other information to the controller 102. The radio resource control unit 1011 manages various configuration information of the terminal apparatuses.

The scheduling unit 1012 determines a frequency and a subframe to which the physical channels (PDSCH and PUSCH) are allocated, the coding rate and a modulation scheme (or MCS) for the physical channels (PDSCH and PUSCH), the transmit power, and the like. The scheduling unit 1012 outputs the determined information to the controller 102.

The scheduling unit 1012 generates information to be used for scheduling of the physical channels (PDSCH and PUSCH), based on scheduling results. The scheduling unit 1012 outputs the generated information to the controller 102.

The controller 102 generates control signals for controlling the transmitter 103 and the receiver 104, based on the information input from the higher layer processing unit 101. The controller 102 generates downlink control information, based on the information input from the higher layer processing unit 101, and outputs the generated information to the transmitter 103.

The transmitter 103 generates downlink reference signals in accordance with the control signals input from the controller 102, codes and modulates the HARQ indicator, the downlink control information, and the downlink data that are input from the higher layer processing unit 101, multiplexes the PHICH, the PDCCH, the EPDCCH, the PDSCH, and the downlink reference signals, and transmits signals obtained through the multiplexing to the terminal apparatus 2A through the transmit and/or receive antenna 105.

The coding unit 1031 codes the HARQ indicator, the downlink control information, and the downlink data that are input from the higher layer processing unit 101, in compliance with a predetermined coding scheme, such as block coding, convolutional coding, turbo coding, Low density parity check (LDPC) coding, Polar coding, and the like, or in compliance with a coding scheme determined by the radio resource control unit 1011. The modulation unit 1032 modulates the coded bits input from the coding unit 1031, in compliance with a predetermined modulation scheme, such as Binary Phase Shift Keying (BPSK), quadrature Phase Shift Keying (QPSK), quadrature amplitude modulation (16QAM), 64QAM, or 256QAM, or the like, or in compliance with a modulation scheme determined by the radio resource control unit 1011.

The downlink reference signal generation unit 1033 generates a sequence, known to the terminal apparatus 2A, that is determined in accordance with a rule predetermined based on a physical cell identifier (PCI, cell ID) for identifying the base station apparatus 1A, and the like, as the downlink reference signals.

The multiplexing unit 1034 multiplexes the modulated modulation symbols of each channel, the generated downlink reference signals, and the downlink control information. To be more specific, the multiplexing unit 1034 maps the modulated modulation symbols of each channel, the generated downlink reference signals, and the downlink control information to resource elements.

The radio transmitting unit 1035 performs Inverse Fast Fourier Transform (IFFT) on the modulation symbols resulting from the multiplexing or the like, generates OFDM symbols, adds cyclic prefix (CP) to the generated OFDM symbols, generates baseband digital signals, converts the baseband digital signals into analog signals, removes unnecessary frequency components through filtering, up-converts the result of the removal into carrier frequencies, performs power amplification, and outputs the final result to the transmit and/or receive antenna 105 for transmission.

The receiver 104 demultiplexes, demodulates, and decodes the received signals received from the terminal apparatus 2A through the transmit and/or receive antenna 105 in accordance with the control signals input from the controller 102, and outputs information resulting from the decoding to the higher layer processing unit 101.

The radio receiving unit 1041 converts uplink signals received through the transmit and/or receive antenna 105 into baseband signals by down-converting, removes unnecessary frequency components, controls the amplification level in such a manner as to suitably maintain the signal level, performs orthogonal demodulation, based on in-phase components and orthogonal components of the received signals, and converts the resulting orthogonally-demodulated analog signals into digital signals.

The radio receiving unit 1041 removes portions corresponding to CP from the digital signals resulting from the conversion. The radio receiving unit 1041 performs Fast Fourier Transform (FFT) for the signals from which CP has been removed, extracts signals in the frequency domain, and outputs the resulting signals to the demultiplexing unit 1042.

The demultiplexing unit 1042 demultiplexes the signals input from the radio receiving unit 1041 into signals such as the PUCCH, the PUSCH, and uplink reference signals. The demultiplexing is performed based on radio resource allocation information included in uplink grant notified to each terminal apparatus 2A, that is predetermined by the base station apparatus 1A in the radio resource control unit 1011.

The demultiplexing unit 1042 performs channel compensation for the PUCCH and the PUSCH. The demultiplexing unit 1042 demultiplexes the uplink reference signals.

The demodulation unit 1043 performs Inverse Discrete Fourier Transform (IDFT) on the PUSCH, acquires modulation symbols, and demodulates the received signals in compliance with a predetermined modulation scheme, such as BPSK, QPSK, 16QAM, 64QAM, and 256QAM, or in compliance with a modulation scheme that the base station apparatus 1A has notified to the terminal apparatus 2A in advance in uplink grant, for each of modulation symbols of the PUCCH and the PUSCH.

The decoding unit 1044 decodes the coded bits of the PUCCH and the PUSCH that have been demodulated, at a predetermined coding rate of a predetermined coding scheme, or at a coding rate notified from the base station apparatus 1A to the terminal apparatus 2A in advance in uplink grant, and outputs the decoded uplink data and uplink control information to the higher layer processing unit 101. In a case that the PUSCH is retransmission, the decoding unit 1044 performs decoding by using coded bits retained in an HARQ buffer input from the higher layer processing unit 101, and the demodulated coded bits.

The measurement unit 106 observes the received signals, and determines various measurement values such as RSRP/RSRQ/RSSI. The measurement unit 106 determines a received power, a reception quality, and a preferable SRS resource index from the SRS transmitted from the terminal apparatus.

Figure 3:
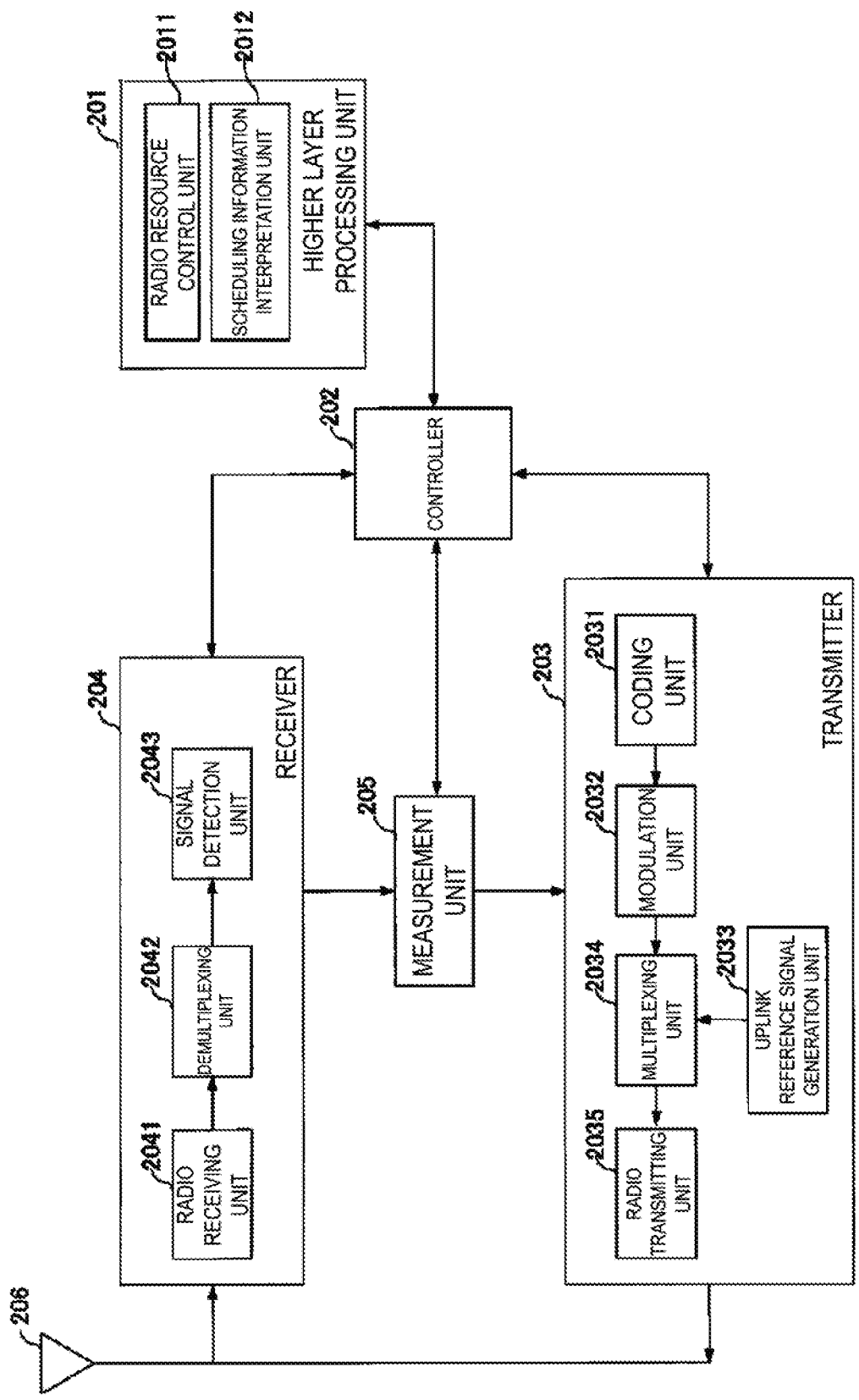
FIG. 3 is a block diagram illustrating an example configuration of a terminal apparatus according to the present embodiment.

FIG. 3 is a schematic block diagram illustrating a configuration of a terminal apparatus according to the present embodiment. As illustrated in FIG. 3, the terminal apparatus includes a higher layer processing unit (higher layer processing step) 201, a controller (controlling step) 202, a transmitter (transmitting step) 203, a receiver (receiving step) 204, a measurement unit (measuring step) 205, a transmit and/or receive antenna 206. The higher layer processing unit 201 includes a radio resource control unit (radio resource controlling stop) 2011 and a scheduling information interpretation unit (scheduling information interpreting step) 2012. The transmitter 203 includes a coding unit (coding step) 2031, a modulation unit (modulating step) 2032, an uplink reference signal generation unit (uplink reference signal generating step) 2033, a multiplexing unit (multiplexing step) 2034, and a radio transmitting unit (radio transmitting step) 2035. The receiver 204 includes a radio receiving unit (radio receiving step) 2041, a demultiplexing unit (demultiplexing step) 2042, and a signal detection unit (signal detecting step) 2043.

The higher layer processing unit 201 outputs uplink data (transport block) generated by a user operation or the like to the transmitter 203. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs information for indicating terminal apparatus functions supported by the terminal apparatus 2A to the transmitter 203.

The radio resource control unit 2011 manages various types of configuration information of the terminal apparatuses 2A. The radio resource control unit 2011 generates information to be mapped to each uplink channel, and outputs the generated information to the transmitter 203.

The radio resource control unit 2011 acquires configuration information transmitted from a base station apparatus, and outputs the acquired information to the controller 202.

The scheduling information interpretation unit 2012 interprets downlink control information received through the receiver 204, and determines scheduling information. The scheduling information interpretation unit 2012 generates control information in order to control the receiver 204 and the transmitter 203 in accordance with the scheduling information, and outputs the generated information to the controller 202.

The controller 202 generates control signals for controlling the receiver 204, the measurement unit 205, and the transmitter 203, based on the information input from the higher layer processing unit 201. The controller 202 outputs the generated control signals to the receiver 204, the measurement unit 205, and the transmitter 203 to control the receiver 204 and the transmitter 203.

The controller 202 controls the transmitter 203 to transmit the CSI/RSRP/RSRQ/RSSI generated by the measurement unit 205 to the base station apparatus.

The receiver 204 demultiplexes, demodulates, and decodes the received signals received from the base station apparatus through the transmit and/or receive antenna 206 in accordance with the control signals input from the controller 202, and outputs the resulting information to the higher layer processing unit 201.

The radio receiving unit 2041 converts downlink signals received through the transmit and/or receive antenna 206 into baseband signals by down-converting, removes unnecessary frequency components, controls the amplification level in such a manner as to suitably maintain the signal level, performs orthogonal demodulation, based on in-phase components and orthogonal components of the received signals, and converts the resulting orthogonally-demodulated analog signals into digital signals.

The radio receiving unit 2041 removes portions corresponding to CP from the digital signals resulting from the conversion, performs fast Fourier transform on the signals from which CP has been removed, and extracts signals in the frequency domain.

The demultiplexing unit 2042 demultiplexes the extracted signals into the PHICH, the PDCCH, the EPDCCH, the PDSCH, and downlink reference signals. The demultiplexing unit 2042 performs channel compensation for the PHICH, the PDCCH, and the EPDCCH, based on channel estimation values of desired signals obtained from channel measurement, detects downlink control information, and outputs the detected downlink control information to the controller 202. The controller 202 outputs the PDSCH and the channel estimation values of desired signals to the signal detection unit 2043.

The signal detection unit 2043 demodulates and decodes signals by using the PDSCH and the channel estimation values, and outputs the resulting signals to the higher layer processing unit 201.

The measurement unit 205 performs various measurements such as a CSI measurement, a Radio Resource Management (RRM) measurement, a Radio Link Monitoring (RLM) measurement, and the like, and determines the CSI/RSRP/RSRQ/RS SI.

The transmitter 203 generates uplink reference signals in accordance with the control signals input from the controller 202, codes and modulates the uplink data (transport block) input from the higher layer processing unit 201, multiplexes the PUCCH, the PUSCH, and the generated uplink reference signals, and transmits the signals resulting from the multiplexing to the base station apparatus through the transmit and/or receive antenna 206.

The coding unit 2031 codes the uplink control information or the uplink data input from the higher layer processing unit 201 in compliance with a coding scheme such as convolutional coding, block coding, turbo coding, LDPC coding, Polar coding, and the like.

The modulation unit 2032 modulates the coded bits input from the coding unit 2031, in compliance with a modulation scheme, such as BPSK, QPSK, 16QAM, and 64QAM, that is notified in the downlink control information, or in compliance with a modulation scheme predetermined for each channel.

The uplink reference signal generation unit 2033 generates a sequence determined according to a predetermined rule (formula), based on a physical cell identity (also referred to as PCI, Cell ID, or the like) for identifying the base station apparatus, a bandwidth in which the uplink reference signals are mapped, cyclic shift notified in uplink grant, a parameter value for generation of a DMRS sequence, and the like.

The multiplexing unit 2034 multiplexes PUCCH and PUSCH signals and the generated uplink reference signals for each transmit antenna port. To be more specific, the multiplexing unit 2034 maps the PUCCH and PUSCH signals and the generated uplink reference signals to resource elements for each transmit antenna port.

The radio transmitting unit 2035 performs Inverse Fast Fourier Transform (IFFT) on the signals resulting from the multiplexing, performs modulation of the OFDM scheme, generates OFDMA symbols, adds CP to the generated OFDMA symbols, generates baseband digital signals, converts the baseband digital signals into analog signals, removes unnecessary frequency components, up-converts the result of the removal into carrier frequencies, performs power amplification, and outputs the final result to the transmit and/or receive antenna 206 for transmission.

Note that the terminal apparatus can perform modulation according to not only the OFDMA scheme but also the SC-FDMA scheme.

In a case that ultra-high capacity communication is required, such as ultra-high definition video transmission, ultra-wideband transmission utilizing high frequency bands is desired. Transmission in high frequency bands needs to compensate for path loss, and beamforming is important. In a case that ultra-large capacity communication is required for each terminal apparatus in an environment in which multiple terminal apparatuses exist in a limited area, Ultra-dense network in which base station apparatuses are deployed in high density is effective. However, in a case that base station apparatuses are deployed in high density, strong interference due to beamforming may be received, while the Signal to noise power ratio (SNR) greatly improves. Accordingly, in order to realize ultra-large capacity communication for every terminal apparatus in a limited area, interference control (avoidance, suppression, cancellation) in consideration of beamforming, and/or coordinated communication of multiple base stations are necessary.

Figure 4:
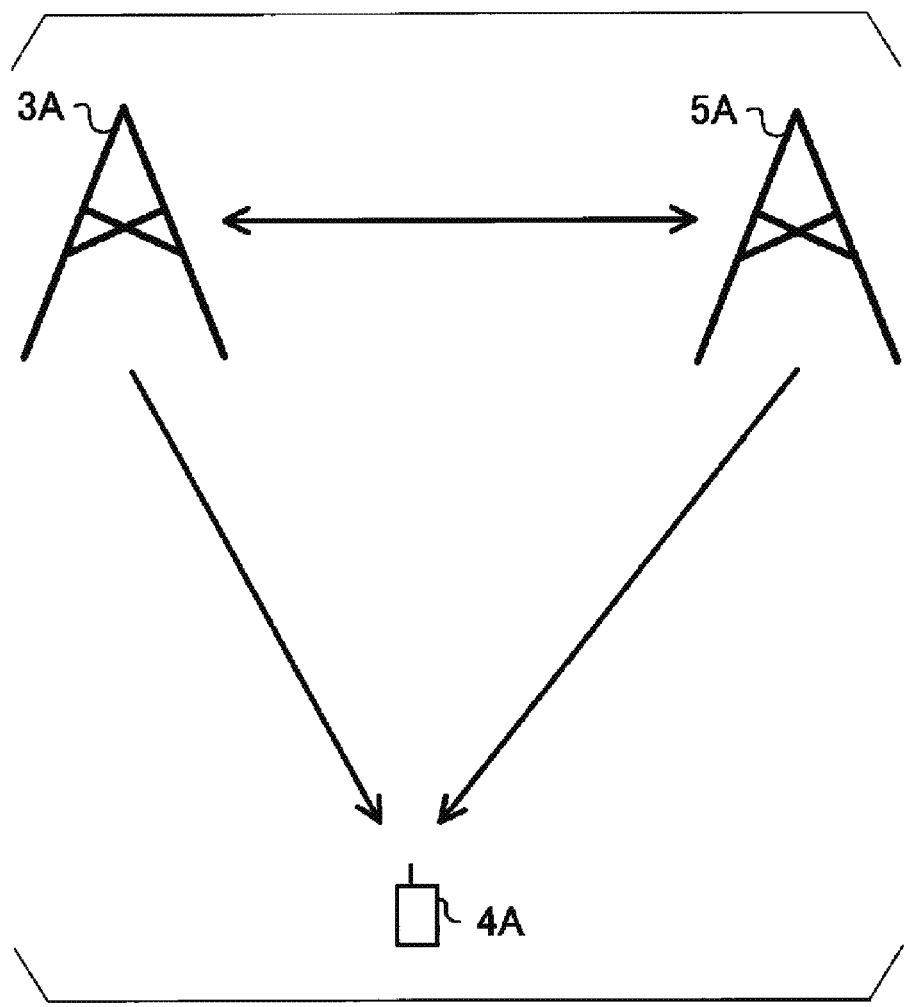
FIG. 4 is a diagram illustrating an example of a communication system according to the present embodiment.

FIG. 4 illustrates an example of a downlink communication system according to the present embodiment. The communication system illustrated in FIG. 4 includes a base station apparatus 3A, a base station apparatus 5A, and a terminal apparatus 4A. The terminal apparatus 4A can use a serving cell provided by the base station apparatus 3A and/or the base station apparatus 5A. In a case that the base station apparatus 3A or the base station apparatus 5A includes multiple antennas, the multiple antennas can be divided into multiple subarrays (panels, sub-panels, transmit antenna ports, transmit antenna groups, receive antenna ports, and receive antenna groups), and transmit/receive beamforming can be applied for each subarray. In this case, each subarray can include a communication apparatus, and the configuration of the communication apparatus is the same as the base station apparatus configuration illustrated in FIG. 2, unless otherwise indicated. In a case that the terminal apparatus 4A includes multiple antennas, the terminal apparatus 4A can transmit or receive by beamforming. In a case that the terminal apparatus 4A includes multiple antennas, the multiple antennas can be divided into multiple subarrays (panels, sub-panels, transmit antenna ports, transmit antenna groups, receive antenna ports, and receive antenna groups), and different transmit/receive beamforming can be applied for each subarray. Each subarray can include a communication apparatus, and the configuration of the communication apparatus is the same as the terminal apparatus configuration illustrated in FIG. 3, unless otherwise indicated. Note that the base station apparatus 3A or the base station apparatus 5A are also simply referred to as a base station apparatus. Note that the terminal apparatus 4A is also simply referred to as a terminal apparatus.

Synchronization signals are used to determine a preferable transmit beam for the base station apparatus, and a preferable receive beam for the terminal apparatus. The base station apparatus transmits a synchronization signal block including the PSS, the PBCH, and the SSS. Note that, in a synchronization signal block burst set period configured by the base station apparatus, one or more synchronization signal blocks are transmitted in the time domain, and a time index is configured for each synchronization signal block. The terminal apparatus may interpret that synchronization signal blocks with the same time index within a synchronization signal block burst set period are transmitted from approximately the same location (quasi co-located (QCL)) in which a delay spread, a Doppler spread, a Doppler shift, an average gain, an average delay, spatial reception parameters, and/or spatial transmission parameters are considered to be the same. Note that the spatial reception parameters (Rx parameters) include, for example, a spatial correlation of the channel, an Angle of Arrival, a receive beam direction, and the like. The spatial transmission parameters include, for example, a spatial correlation of the channel, an Angle of Departure, a transmit beam direction, and the like. That is, the terminal apparatus can assume that synchronization signal blocks with the same time index are transmitted in the same transmit beam in a synchronization signal block burst set period, and that synchronization signal blocks with different time indexes are transmitted with different beams. Accordingly, in a case that the terminal apparatus reports information for indicating a time index of a preferable synchronization signal block in a synchronization signal block burst set period to the base station apparatus, the base station apparatus can know a transmit beam preferable for the terminal apparatus. The terminal apparatus can determine a preferable receive beam for the terminal apparatus by using a synchronization signal block with the same time index in different synchronization signal block burst set periods. Thus, the terminal apparatus can associate the time index of the synchronization signal block and the receive beam direction and/or subarray. Note that, in a case that the terminal apparatus includes multiple subarrays, different subarrays may be used in a case of connecting with different cells.

There are four QCL types indicating states of QCL. The four QCL types are referred to as QCL type A, QCL type B, QCL type C, and QCL type D. QCL type A is a relationship (state) in which the Doppler shift, the Doppler spread, the average delay, and the delay spread are QCL. QCL type B is a relationship (state) in which the Doppler shift, and the Doppler spread are QCL. QCL type C is a relationship (state) in which the average delay, and the Doppler shift are QCL. QCL type D is a relationship (state) in which the spatial reception parameter is QCL. Note that the four QCL types can be combined. Examples are QCL type A+QCL type D, QCL type B+QCL type D, and the like.

The terminal apparatus may be configured with up to M Transmit Configuration Indicator (TCI) states by higher layer signaling. A TCI state includes a TCI-RS set configuration of a reference signal set (RS set). The TCI-RS set configuration includes parameters for configuring the QCL relationship between the reference signal included in the RS set and the DMRS port (DMRS port group) of the PDSCH. The RS set includes a QCL type associated with one or two downlink reference signals (DL RS). Note that in a case that the RS set includes two DL RSs, the QCL type for each is not the same. Note that the TCI state is included in the DCI and is used for demodulation (decoding) of the associated PDSCH. Note that in a case that the QCL type D is configured in the received TCI state, the terminal apparatus can know the receive beam direction of the associated PDSCH. Therefore, the TCI can be said to be information associated with the receive beam direction of the terminal apparatus.

The CSI-RS can be used to determine a preferable transmit beam for the base station apparatus and a preferable receive beam for the terminal apparatus.

The terminal apparatus receives the CSI-RS in a resource configured by a resource configuration, calculates the CSI or the RSRP from the CSI-RS, and reports the CSI or RSRP to the base station apparatus. In a case that the CSI-RS resource configuration includes multiple CSI-RS resource configurations and/or the resource repetition is OFF, the terminal apparatus receives the CSI-RS in the same receive beam with each CSI-RS resource and calculates the CRI. For example, in a case that the CSI-RS resource set configuration includes K (where K is an integer of 2 or greater) CSI-RS resource configurations, the CRI indicates N CSI-RS resources preferable from K CSI-RS resources. Here, N is a positive integer less than K. In a case that the terminal apparatus reports multiple CRIs, the terminal apparatus can report the CSI-RSRP measured in each CSI-RS resource to the base station apparatus in order to indicate which CSI-RS resource quality is good. The base station apparatus can learn the transmit beam direction of the base station apparatus preferable for the terminal apparatus by the CRI reported from the terminal apparatus, by transmitting with beamforming (precoding) the CSI-RS in different beam directions on each of the multiple configured CSI-RS resources. On the other hand, the receive beam direction preferable for the terminal apparatus can be determined by using the CSI-RS resource to which the transmit beam of the base station apparatus is fixed. For example, in a case that the CSI-RS resource configuration includes multiple CSI-RS resource configurations and/or the resource repetition is ON, the terminal apparatus can determine a preferable receive beam direction from the CSI-RS received in each different receive beam direction in each CSI-RS resource. Note that the terminal apparatus may report the CSI-RSRP after determining a preferable receive beam direction. Note that in a case that the terminal apparatus includes multiple subarrays, the terminal apparatus can select a preferable subarray in determining a preferable receive beam direction. Note that a preferable receive beam direction for the terminal apparatus may be associated with the CRI. In a case that the terminal apparatus reports multiple CRIs, the base station apparatus can fix the transmit beam with the CSI-RS resource associated with each CRI. At this time, the terminal apparatus can determine a preferable receive beam direction for each CRI. For example, the base station apparatus may associate a downlink signal/channel with the CRI to transmit. At this time, the terminal apparatus must receive with a receive beam associated with the CRI. In the multiple CSI-RS resources configured, different base station apparatuses can transmit the CSI-RS. In this case, the network side can know which base station apparatus has good communication quality by the CRI. In a case that the terminal apparatus includes multiple subarrays, the terminal apparatus can receive with the multiple subarrays at the same timing. Accordingly, in a case that the base station apparatus associates the CRI to each of multiple layers (codeword, transport block) with downlink control information or the like to transmit, the terminal apparatus can receive multiple layers by using a subarray or a receive beam corresponding to each CRI. However, in a case of using an analog beam, in a case that there is one receive beam direction used at the same timing in one subarray, and that two CRIs corresponding to one subarray of the terminal apparatus are configured at the same time, the terminal apparatus may not be able to receive multiple receive beams. To avoid this problem, for example, the base station apparatus divides the multiple CSI-RS resources configured into groups, and determines the CRI by using the same subarray in a group. In a case that different subarrays are used between groups, the base station apparatus can know multiple CRIs that can be configured at the same timing. Note that a group of CSI-RS resources may be CSI-RS resources configured by a resource configuration or a resource set configuration. Note that the CRI that can be configured at the same timing may be QCL. At this time, the terminal apparatus can transmit the CRI in association with QCL information. The QCL information is information about QCL for prescribed antenna ports, prescribed signals, or prescribed channels. In a case that long term characteristics of a channel on which a symbol on an antenna port is carried can be estimated from a channel on which a symbol on another antenna port is carried, the two antenna ports are said to be QCL. The long term characteristics includes a delay spread, a Doppler spread, a Doppler shift, an average gain, an average delay, spatial reception parameters, and/or spatial transmission parameters. For example, in a case that two antenna ports are QCL, the terminal apparatus can consider the two antenna ports to have the same long term characteristics. For example, in a case that the terminal apparatus reports distinguishing between CRIs that are QCL in terms of spatial reception parameters and CRIs that are not QCL in terms of spatial reception parameters, the base station apparatus can perform not configuring the CRIs that are QCL in terms of spatial reception parameters at the same timing, but configuring the CRI that are not QCL in terms of spatial reception parameters at the same timing. The base station apparatus may request the CSI for each subarray of the terminal apparatus. In this case, the terminal apparatus reports the CSI for each subarray. Note that, in a case that the terminal apparatus reports multiple CRIs to the base station apparatus, the terminal apparatus may only report CRIs that are not QCL.

In order to determine a preferable transmit beam for the base station apparatus, a codebook is used in which candidates of prescribed precoding (beamforming) matrices (vectors) are defined. The base station apparatus transmits the CSI-RS, and the terminal apparatus determines a preferable precoding (beamforming) matrix from the codebook, and reports the matrix as the PMI to the base station apparatus. In this way, the base station apparatus can recognize a preferable transmit beam direction for the terminal apparatus. Note that the codebook includes precoding (beamforming) matrices for combining antenna ports and precoding (beamforming) matrices for selecting antenna ports. In a case of using a codebook for selecting antenna ports, the base station apparatus can use different transmit beam directions for each antenna port. Accordingly, in a case that the terminal apparatus reports a preferable antenna port as the PMI, the base station apparatus can know a preferable transmit beam direction. Note that a preferable receive beam for the terminal apparatus may be a receive beam direction associated with the CRI, or a preferable receive beam direction may be determined again. In a case of using a codebook for selecting antenna ports, and in a case that the preferable receive beam direction for the terminal apparatus is the receive beam direction associated with the CRI, the receive beam direction for receiving the CSI-RS is desirably received in the receive beam direction associated with the CRI. Note that even in a case of using the receive beam direction associated with the CRI, the terminal apparatus can associate the PMI with the receive beam direction. In a case of using a codebook for selecting antenna ports, each antenna port may be transmitted from a different base station apparatus (cell). In this case, in a case that the terminal apparatus reports the PMI, the base station apparatus can know with which base station apparatus (cell) communication quality is preferable. Note that in this case, antenna ports of different base station apparatuses (cells) may not be QCL.

To improve reliability and increase frequency utilization efficiency, coordinated communication of multiple base station apparatuses (transmission and/or reception points) can be performed. The coordinated communication of multiple base station apparatuses (transmission and/or reception points) includes, for example, Dynamic Point Selection (DPS) for dynamically switching preferable base station apparatuses (transmission and/or reception points), Joint Transmission (JT) for transmitting data signals from multiple base station apparatuses (transmission and/or reception points), and the like. In a case of communicating with multiple base station apparatuses, the terminal apparatus may communicate by using multiple subarrays. For example, the terminal apparatus 4A may use the subarray 1 in a case of communicating with the base station apparatus 3A, and may use subarray 2 in a case of communicating with the base station apparatus 5A. In a case of performing coordinated communication with multiple base station apparatuses, the terminal apparatus may dynamically switch multiple subarrays or may transmit and/or receive by multiple subarrays at the same timing. At this time, it is desirable that the terminal apparatus 4A and the base station apparatus 3A/5A share information related to subarrays of the terminal apparatuses used for communication.

The terminal apparatus can include CSI configuration information in a CSI report. For example, the CSI configuration information may include information for indicating a subarray. For example, the terminal apparatus may transmit a CSI report including a CRI and an index for indicating a subarray. In this way, the base station apparatus can associate the transmit beam direction with the subarray of the terminal apparatus. Alternatively, the terminal apparatus may transmit a CRI report including multiple CRIs. In this case, in a case that it is defined that a portion of multiple CRIs is associated with the subarray 1 and the remainder of CRIs is associated with the subarray 2, the base station apparatus can associate the index for indicating the subarray with the CRI. The terminal apparatus can transmit the CRI report by joint coding the CRI and the index for indicating the subarray in order to reduce the control information. In this case, one bit of N (N is an integer of 2 or greater) bits for indicating the CRI indicates the subarray 1 or the subarray 2, and the remaining bits indicate the CRI. Note that, in the case of joint coding, one bit is used for an index for indicating a subarray, so the number of bits that can represent the CRI is reduced. Thus, in a case that the terminal apparatus performs the CSI report including an index for indicating a subarray, and in a case that the number of CSI-RS resources indicated by the resource configuration is greater than the number that can represent the CRI, the CRI can be determined from some CSI-RS resources. Note that in a case that it is determined that the CSI is calculated in different subarrays in different resource configurations, the base station apparatus can know the CSI for each subarray of the terminal, in a case that the terminal apparatus transmits the CSI calculated in a different subarray for each resource configuration ID.

The CSI configuration information can include configuration information for CSI measurement. For example, the configuration information for CSI measurement may be a measurement link configuration or other configuration information. In this way, the terminal apparatus can associate the configuration information of CSI measurement with a subarray and/or a receive beam direction. For example, considering coordinated communication with two base station apparatuses (e.g., the base station apparatuses 3A and 5A), it is desirable that there are several pieces of configuration information. Suppose the configuration of the CSI-RS for channel measurement transmitted by the base station apparatus 3A is a resource configuration 1, and the configuration of the CSI-RS for channel measurement transmitted by the base station apparatus 5A is a resource configuration 2. In this case, the configuration information 1 may be the resource configuration 1, the configuration information 2 may be the resource configuration 2, and the configuration information 3 may be the resource configuration 1 and the resource configuration 2. Note that each of the configuration information may include a configuration of interference measurement resources. In a case that the CSI measurement is performed based on the configuration information 1, the terminal apparatus can measure the CSI by the CSI-RS transmitted from the base station apparatus 3A. In a case that the CSI measurement is performed based on the configuration information 2, the terminal apparatus can measure the CSI transmitted from the base station apparatus 5A. In a case that the CSI measurement is performed based on the configuration information 3, the terminal apparatus can measure the CSI by the CSI-RS transmitted from the base station apparatus 3A and the base station apparatus 5A. The terminal apparatus can associate the subarray and/or the receive beam direction used for the CSI measurement for each of the configuration information 1 to 3. Accordingly, the base station apparatus can indicate the preferable subarray and/or receive beam direction used by the terminal apparatus by indicating the configuration information 1 to 3. Note that in a case that the configuration information 3 is configured, the terminal apparatus determines the CSI for the resource configuration 1 and/or CSI for the resource configuration 2. At this time, the terminal apparatus can associate the subarray and/or the receive beam direction for each of the resource configuration 1 and/or the resource configuration 2. The terminal apparatus can also associate the resource configuration 1 and/or the resource configuration 2 with a codeword (transport block). For example, the CSI for the resource configuration 1 may be the CSI of the codeword 1 (transport block 1), and the CSI for the resource configuration 2 may be the CSI of the codeword 2 (transport block 2). The terminal apparatus can also determine one CSI in consideration of the resource configuration 1 and the resource configuration 2. However, even in a case of determining one CSI, the terminal apparatus can associate the subarray and/or the receive beam direction for each of the resource configuration 1 and the resource configuration 2.

In a case that multiple resource configurations are configured (for example, in a case that the configuration information 3 described above is configured), the CSI configuration information may include information for indicating whether the CSI includes one CRI or the CRI for each of the multiple resource configurations. In a case that the CSI includes one CRI, the CSI configuration information may include a resource configuration ID for which the CRI has been calculated. According to the CSI configuration information, the base station apparatus can know the assumption with which the terminal apparatus has calculated the CSI or which resource configuration had good reception quality.

The base station apparatus can transmit a CSI request for requesting a CSI report to the terminal apparatus. The CSI request can include whether to report CSI in one subarray or to report CSI in multiple subarrays. In this case, in a case that the terminal apparatus is required to report CSI in one subarray, the terminal apparatus transmits a CSI report not including an index for indicating a subarray. In a case that the terminal apparatus is required to report CSI in multiple subarrays, the terminal apparatus transmits a CSI report including an index for indicating a subarray. Note that, in a case that the base station apparatus requests a CSI report in one subarray, the base station apparatus can indicate the subarray for which the CSI is calculated by the terminal apparatus by means of an index for indicating a subarray or a resource configuration ID. In this case, the terminal apparatus calculates the CSI in the subarray indicated by the base station apparatus.

The base station apparatus can transmit a CSI request including configuration information of a CSI measurement. In a case that the CSI request includes configuration information of a CSI measurement, the terminal apparatus determines CSI, based on the configuration information of the CSI measurement. The terminal apparatus may report the CSI to the base station apparatus, but may not report the configuration information of the CSI measurement.

The terminal apparatus and the base station apparatus according to the present embodiment can configure new virtual antenna ports in order to select a preferable subarray. Each of the virtual antenna ports are associated with a physical subarray and/or a receive beam. The base station apparatus can notify the terminal apparatus of the virtual antenna ports, and the terminal apparatus can select a subarray for receiving the PDSCH. The virtual antenna ports can be configured to be QCL. The base station apparatus can notify the terminal apparatus of multiple virtual antenna ports. The terminal apparatus may receive the associated PDSCH by using one subarray in a case that the notified virtual antenna ports are QCL, and can receive the associated PDSCH by using two or more subarrays in a case that the notified virtual antenna ports are not QCL. The virtual antenna ports can be associated with any one or more of a CSI-RS resource, a DMRS resource, and an SRS resource. By configuring the virtual antenna ports, the base station apparatus can configure a subarray in a case that the terminal apparatus transmits an RS in a resource in any one or more of a CSI-RS resource, a DMRS resource, and an SRS resource.

In a case that multiple base station apparatuses are in coordinated communication, it is desirable for the terminal apparatus to receive in a subarray and/or receive beam direction preferable for the PDSCH transmitted by each base station apparatus. Thus, the base station apparatus transmits information for the terminal apparatus to be able to receive in a preferable subarray and/or receive beam direction. For example, the base station apparatus can transmit CSI configuration information or information for indicating CSI configuration information included in downlink control information. In a case that the terminal apparatus receives the CSI configuration information, the terminal apparatus can receive in the subarray and/or the receive beam direction associated with the CSI configuration information.

For example, the base station apparatus can transmit information for indicating a subarray and/or a receive beam direction as CSI configuration information. Note that the CSI configuration information may be transmitted in a prescribed DCI format. The information for indicating a receive beam direction may be a CRI, a PMI, or a time index of a synchronization signal block. The terminal apparatus can know a preferable subarray and/or a receive beam direction from the received DCI. Note that the information for indicating a subarray is expressed by 1 bit or 2 bits. In a case that the information for indicating a subarray is indicated by 1 bit, the base station apparatus can indicate the subarray 1 or the subarray 2 by "0" or "1" to the terminal apparatus. In a case that the information for indicating a subarray is indicated by 2 bits, the base station apparatus can instruct the terminal apparatus to switch subarrays and to receive by two subarrays. Note that in a case that it is determined that the CSI is calculated in different subarrays in different resource configurations, the base station apparatus may indicate a subarray of the terminal apparatus by transmitting the DCI including the resource configuration ID.

For example, the base station apparatus can transmit configuration information of a CSI measurement as CSI configuration information. In this case, the terminal apparatus can receive the PDSCH in the subarray and/or the receive beam direction associated with the CSI fed back by the received configuration information of the CSI measurement. Note that in a case that the configuration information of the CSI measurement indicates the configuration information 1 or the configuration information 2, the CSI configuration information indicates that the PDSCH transmission is associated with one resource configuration information. In a case that the configuration information of the CSI measurement indicates the configuration information 3, the CSI configuration information indicates that the PDSCH transmission is associated with multiple pieces of resource configuration information.

The CSI configuration information may be associated with a parameter (field) included in the DCI, such as a DMRS Scrambling identity (SCID). For example, the base station apparatus can configure an association of an SCID and CSI measurement configuration information. In this case, the terminal apparatus can refer to the configuration information of the CSI measurement from the SCID included in the DCI, and can receive the PDSCH in the subarray and/or the receive beam direction associated with the configuration information of the CSI measurement.

The base station apparatus can also configure two DMRS antenna port groups. These two DMRS port groups are also referred to as a DMRS port group 1 (first DMRS port group), and a DMRS port group 2 (second DMRS port group). Antenna ports in a DMRS antenna port group are QCL, and antenna ports between DMRS antenna port groups are not QCL. Accordingly, in a case that DMRS antenna port groups and subarrays of the terminal apparatus are associated, the base station apparatus can indicate a subarray of the terminal apparatus with a DMRS antenna port number included in the DCI. For example, in a case that a DMRS antenna port number included in the DCI is included in one DMRS antenna port group, the terminal apparatus performs reception by using one subarray corresponding to the DMRS antenna port group. In a case that a DMRS antenna port number included in the DCI is included in both the two DMRS antenna port groups, the terminal apparatus, the terminal apparatus receives in two subarrays. One DMRS antenna port group may be associated with one codeword (transport block). The relationship between a DMRS antenna port group and an index of a codeword (transport block) may be predetermined or may be indicated by the base station apparatus.

Note that in a case that it is determined that the CSI is calculated in different subarrays in different resource configurations, and in a case that DMRS antenna port groups and resource configuration IDs or CSI-RS resources are associated, the terminal apparatus can identify the resource configuration ID or the CSI-RS resource, and can know the subarray and/or the receive beam direction by the DMRS antenna port included in the DCI.

The base station apparatus can configure DMRS antenna port groups and CSI configuration information in association with each other. Note that in a case that the CSI configuration information includes configuration information of a CSI measurement and the configuration information of the CSI measurement indicates the configuration information 3, the terminal apparatus demodulates in a subarray and/or a receive beam direction corresponding to the resource configuration 1 for DMRS antenna ports included in the DMRS antenna port group 1, and demodulates in a subarray and/or a receive beam direction corresponding to the resource configuration 2 for DMRS antenna ports included in the DMRS antenna port group 2.

Figure 5:
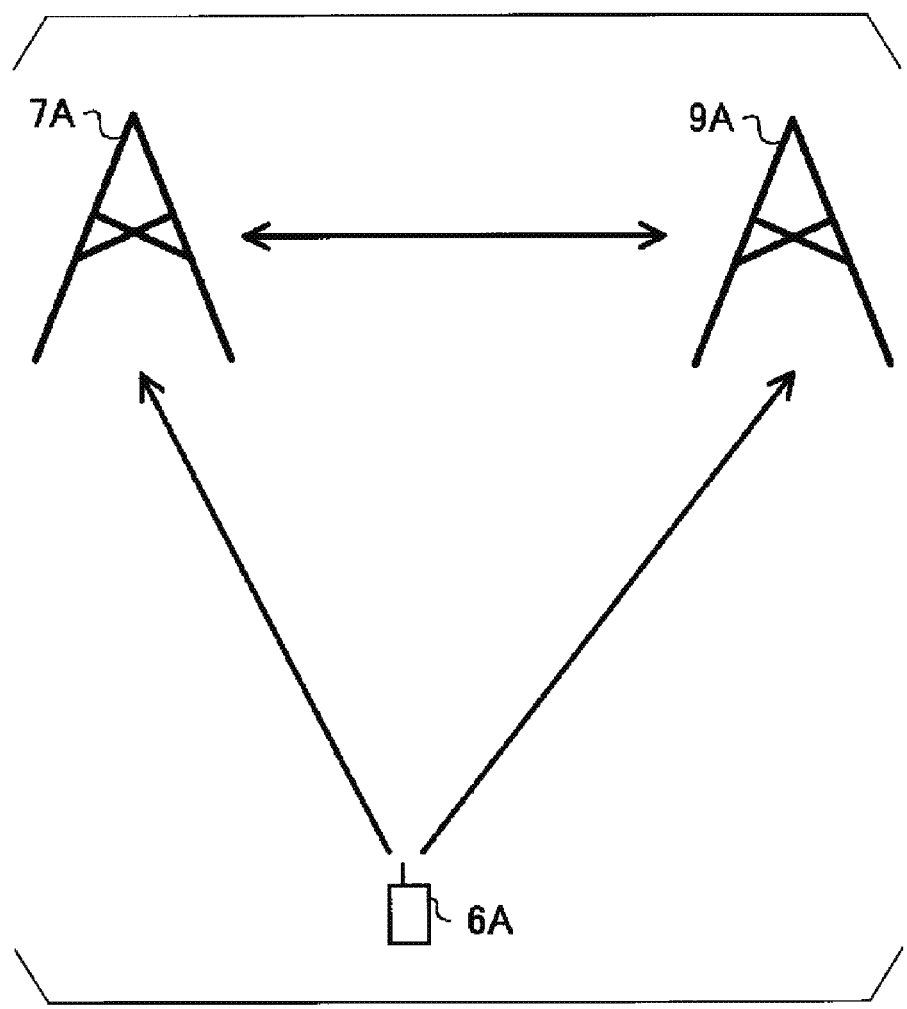
FIG. 5 is a diagram illustrating an example of a communication system according to the present embodiment.

FIG. 5 illustrates an example of an uplink communication system according to the present embodiment. The communication system illustrated in FIG. 5 includes a base station apparatus 7A, a base station apparatus 9A, and a terminal apparatus 6A. The terminal apparatus 6A can use the base station apparatus 7A and/or the base station apparatus 9A as the serving cells. In a case that the base station apparatus 7A or the base station apparatus 9A includes multiple antennas, the multiple antennas can be divided into multiple subarrays (panels, sub-panels), and transmit/receive beamforming can be applied for each subarray. In this case, each subarray can include a communication apparatus, and the configuration of the communication apparatus is the same as the base station apparatus configuration illustrated in FIG. 2, unless otherwise indicated. In a case that the terminal apparatus 6A includes multiple antennas, the terminal apparatus 6A can transmit or receive by beamforming. In the case that the terminal apparatus 6A includes multiple antennas, the multiple antennas can be divided into multiple subarrays (panels, sub-panels), and different transmit/receive beamforming can be applied for each subarray. Each subarray can include a communication apparatus, and the configuration of the communication apparatus is the same as the terminal apparatus configuration illustrated in FIG. 3, unless otherwise indicated. Note that the base station apparatus 7A and the base station apparatus 9A are also simply referred to as base station apparatuses. Note that the terminal apparatus 6A is also also simply referred to as a terminal apparatus.

SRSs are used to determine a preferable transmit beam for the terminal apparatus and a preferable receive beam for the base station apparatus in the uplink. The base station apparatus can transmit (configure) configuration information related to the SRS by higher layer signaling. The configuration information includes one or more SRS resource set configurations. Each SRS resource set configuration includes an SRS resource set configuration ID and/or one or more SRS resource configurations. The SRS resource set configuration ID is used to identify an SRS resource set configuration. An SRS resource configuration includes an SRS resource configuration ID, the number of SRS antenna ports, an SRS transmission Comb, an SRS resource mapping, an SRS frequency hopping, and an SRS resource configuration type. The SRS resource configuration ID is used to identify an SRS resource configuration. The SRS transmission comb indicates frequency intervals of comb-shaped spectrum and the position (offset) within the frequency intervals. The SRS resource mapping indicates the OFDM symbol positions at which the SRSs are allocated in the slot and the number of OFDM symbols. The SRS frequency hopping is information for indicating the frequency hopping of the SRSs. The SRS resource configuration type indicates an operation of the SRS resource configuration in the time domain. Specifically, the SRS resource configuration type indicates whether the SRS resource configuration is a configuration in which the SRSs are transmitted aperiodically, a configuration in which the SRSs are transmitted periodically, or a configuration in which the SRSs are transmitted semi-persistently. Note that in the case of a configuration in which the SRSs are transmitted semi-persistently, the SRSs are transmitted periodically during a period since activated by higher layers until deactivated.

In a case that multiple SRS resources are configured, transmitting by the terminal apparatus in different transmit beam directions on SRS resources allows the base station apparatus to determine a preferable SRS resource. In a case that the base station apparatus transmits (indicates), to the terminal apparatus, an SRS Resource Indicator (SRI), which is information for indicating the SRS resource, the terminal apparatus can know that the transmit beam direction transmitted on the SRS resource is preferable. Note that the base station apparatus can request the terminal apparatus to transmit the same transmit beam for a prescribed period of time in order to determine a preferable receive beam for the base station apparatus. The terminal apparatus transmits in the same transmit beam direction as transmitted in the indicated SRS on the indicated SRI resource for the indicated period of time in accordance with the request from the base station apparatus.

In a case that the terminal apparatus includes multiple subarrays, the terminal apparatus can communicate with multiple base station apparatuses (transmission and/or reception points). In the example of FIG. 5, the terminal apparatus 6A can use the base station apparatus 7A and the base station apparatus 9A as the serving cells. In this case, for the terminal apparatus 6A, the transmit beam direction preferable for communication with the base station apparatus 7A and the transmit beam direction preferable for communication with the base station apparatus 9A are likely to be different. Accordingly, the terminal apparatus 6A can communicate with the base station apparatus 7A and the base station apparatus 9A at the same timing in a case of transmitting in different transmit beam directions at different subarrays.

In a case that the terminal apparatus transmits SRSs on multiple antenna ports in a certain SRS resource, the terminal apparatus can use different transmit beam directions for antenna ports. In this case, in a case that the base station apparatus indicates the terminal apparatus to transmit in a preferable antenna port number, the terminal apparatus can know a preferable transmit beam direction. Note that the base station apparatus can also indicates a transmit PMI (TPMI) to the terminal apparatus by using a codebook for selecting the antenna port. The base station apparatus can indicate the terminal apparatus to which codebook to reference. The terminal apparatus can use the transmit beam direction corresponding to the antenna port number indicated by the TPMI, with reference to the indicated codebook.

In a case that the terminal apparatus includes multiple subarrays, and the terminal apparatus can transmit at the same timing in the multiple subarrays, the terminal apparatus can apply different antenna port numbers between subarrays. At this time, in a case that the terminal apparatus transmits SRSs by using transmit beams from different antenna ports of the subarrays and receives the TPMI from the base station apparatus, the terminal apparatus can know preferable subarray and transmit beam direction. Therefore, the terminal apparatus can associate the TPMI with the subarray and the transmit beam direction.

Note that in a case that the terminal apparatus communicates with multiple base station apparatuses (transmission and/or reception points), the terminal apparatus can transmit the same signal (data) or can transmit different signals (data) to each base station apparatus (transmission and/or reception point). In a case that the terminal apparatus communicates with multiple base station apparatuses (transmission and/or reception points) by using the same signal (data), the signal received at the multiple base station apparatuses (transmission and/or reception points) can be combined to improve reception quality, so it is desirable to coordinate the multiple base station apparatuses (transmission and/or reception points) to perform reception processing.

The base station apparatus can use DCI for scheduling of the PUSCH. In a case that the terminal apparatus communicates with multiple base station apparatuses, each base station apparatus can transmit DCI for scheduling of the PUSCH. The DCI includes an SRI and/or a TPMI, by which the terminal apparatus can know a transmit beam preferable for the base station apparatus. In a case that the terminal apparatus communicates with multiple base station apparatuses, the terminal apparatus can transmit the PUSCH to the multiple base station apparatuses in DCI from one base station apparatus. For example, in a case that the DCI includes control information for multiple layers (codewords, transport blocks), and an SRI and/or a TPMI are indicated (configured) for each layer, each layer is transmitted by a transmit beam preferable for each base station apparatus. In this way, in a case that one piece of DCI is received, the terminal apparatus can transmit different signals (data) to the multiple base station apparatuses. In a case that the DCI includes control information of one layer and multiple SRIs and/or TPMIs are indicated (configured) for the one layer, the terminal apparatus transmits the one layer (the same data) by using different transmit beams. In this way, in a case that one piece of DCI is received, the terminal apparatus can transmit the same signal (data) to the multiple base station apparatuses.

In a case that the terminal apparatus transmits to multiple base station apparatuses at the same timing, it is desirable that each base station apparatus knows the communication quality with the terminal apparatus at the same timing. Thus, the base station apparatus can indicate (trigger) multiple SRIs and an SRS resource corresponding to each SRI by one piece of DCI. In other words, in a case that the terminal apparatus transmits SRSs in transmit beam directions corresponding to each SRI at the same timing, each base station apparatus can know the communication quality with the terminal apparatus at the same timing.

In a case that the subarrays included in the terminal apparatus use only one transmit beam direction at the same timing, the terminal apparatus transmits to multiple base station apparatuses at the same timing by different subarrays. At this time, in a case that two SRIs are indicated (configured) by one piece of DCI from the base station apparatus, and that the two SRI are associated with the same subarray, the terminal apparatus may not be able to perform the transmission corresponding to the two SRI at the same timing. To avoid this problem, for example, the base station apparatus can divide multiple SRS resources into groups to configure the groups, and can require the terminal apparatus to transmit SRSs by using the same subarray in a group. In a case that different subarrays are used between groups, the base station apparatus can know multiple SRIs that can be configured at the same timing. Note that a group of SRS resources may be an SRS resource set. Note that SRSs (SRS resources) that can be configured in the same timing may not be QCL. At this time, the terminal apparatus can transmit the SRS in association with QCL information. For example, in a case that the terminal apparatus transmits SRSs that are QCL and SRSs that are not QCL in a distinguishable manner, the base station apparatus can perform not configuring SRIs that are QCL at the same timing but configuring SRIs that are not QCL at the same timing. The base station apparatus may request the SRS for each subarray of the terminal apparatus. In this case, the terminal apparatus transmits the SRS for each subarray.

Note that in a case that the terminal apparatus is indicated two SRIs that cannot be transmitted at the same timing from the base station apparatus, the terminal apparatus can request a procedure of beam recovery for performing transmit beam selection again for the base station apparatus. The beam recovery procedure is a procedure performed in a case that the terminal apparatus has removed tracking of the transmit and/or receive beam from the base station apparatus, and the communication quality is significantly reduced, and the terminal apparatus needs to acquire a new connection destination (transmit beam of the base station apparatus) in advance. The terminal apparatus according to the present embodiment can use the procedure of beam recovery in a state in which the transmit beam itself is ensured, but to eliminate a state in which two SRIs that cannot be transmitted at the same timing are configured.

DMRSs for the PDSCH or the PUSCH are configured with the DMRS configuration type 1 (first DMRS configuration type) or the DMRS configuration type 2 (second DMRS configuration type). The DMRS configuration type 1 supports up to 8 DMRS antenna ports, and the DMRS configuration type 2 supports up to 12 DMRS antenna ports. The DMRSs are multiplexed in Code Division Multiplexing (CDM) with an Orthogonal Cover Code (OCC). The code length of the OCC is 4, with the length in the frequency direction being 2 and the length in the time direction being 2. 4 DMRS antenna ports are multiplexed in CDM by OCC. Note that the 4 DMRS antenna ports to be multiplexed in CDM are also referred to as a CDM group (DMRS CDM group). In this case, the DMRS configuration type 1 includes two CDM groups, and the DMRS configuration type 2 includes three CDM groups. DMRSs of different CDM groups are mapped to orthogonal resources. Note that the two CDM groups of the DMRS configuration type 1 are also referred to as a CDM group 0 (first CDM group) and a CDM group 1 (second CDM group). The three CDM groups of the DMRS configuration type 2 are also referred to as the CDM group 0 (first CDM group), the CDM group 1 (second CDM group), and a CDM group 2 (third CDM group). For the DMRS configuration type 1, the CDM group 0 includes DMRS antenna ports 1000, 1001, 1004, and 1005, and the CDM group 1 includes DMRS antenna ports 1002, 1003, 1006, and 1007. For the DMRS configuration type 2, the CDM group 0 includes DMRS antenna ports 1000, 1001, 1006, and 1007, the CDM group 1 includes DMRS antenna ports 1002, 1003, 1008, and 1009, and the CDM group 2 includes DMRS antenna ports 1004, 1005, 1010, and 1011. Note that a CDM group associated with DMRSs is also referred to as a DMRS CDM group.

The DMRS antenna port number for the PDSCH or the PUSCH and the number of DMRS CDM groups without data are indicated by DCI. The terminal apparatus can know the number of DMRS antenna ports by the number of DMRS antenna port numbers indicated. The number of DMRS CDM groups without data indicates that the PDSCH is not allocated for resources on which the DMRSs of the associated CDM groups are mapped. Note that in a case that the number of the DMRS CDM groups without data is 1, the CDM group to be referenced is the CDM group 0, and in a case that the number of DMRS CDM groups without data is 2, the CDM groups to be referenced are the CDM group 0 and the CDM group 1, and in a case that the number of DMRS CDM groups without data is 3, the CDM groups to be referenced are the CDM group 0, the CDM group 1, and the CDM group 2.

Note that, for example, in a case of transmission of Multi User-Multiple Input Multiple Output (MU-MIMO), the DMRS for the PDSCH or the PUSCH may be different in power from the PDSCH. For example, suppose that the base station apparatus spatially multiplexes and transmits four layers of PDSCH for each of two terminal apparatuses. In other words, the base station apparatus spatially multiplexes and transmits a total of eight layers of PDSCH. In this case, the base station apparatus indicates the DMRS antenna port numbers of the CDM group 0 to one terminal apparatus, and indicates the DMRS antenna port numbers of the CDM group 1 to the other terminal apparatus. The base station apparatus indicates that the number of DMRS CDM groups without data is 2 for the two terminal apparatuses. At this time, the number of spatial multiplexing of DMRS is 4 and the number of spatial multiplexing of PDSCH is 8, and thus the power ratio (offset) between the DMRS and the PDSCH is twice (different by 3 dB). For example, suppose that the base station apparatus spatially multiplexes and transmits four layers of PDSCH for each of three terminal apparatuses. In other words, the base station apparatus spatially multiplexes and transmits a total of 12 layers of PDSCH. In this case, the base station apparatus indicates the DMRS antenna port numbers of the CDM group 0, the CDM group 1, and the CDM group 2, for the three respective terminal apparatuses. The base station apparatus indicates that the number of DMRS CDM groups without data is 3 for the three terminal apparatuses. At this time, the number of spatial multiplexing of DMRS is 4 and the number of spatial multiplexing of PDSCH is 12, and thus the power ratio of the DMRS and the PDSCH is three times (different by 4.77 dB). Accordingly, the base station apparatus or the terminal apparatus transmits the DMRS and the PDSCH in consideration of the power ratio of the DMRS and the PDSCH in multiple of the number of the CDM groups. The base station apparatus or the terminal apparatus demodulates (decodes) the PDSCH in consideration of the power ratio of the DMRS and the PDSCH in multiple of the number of the CDM groups. Note that the power ratio of the DMRS and the PDSCH in multiple of the number of the CDM groups is also considered in a case of Single user MIMO (SU-MIMO) transmission with a large number of spatial multiplexing.

However, in a case that the terminal apparatus communicates with multiple base station apparatuses (transmission and/or reception points), the power ratio of the DMRS and the PDSCH may be different from those described above. For example, in a case that the terminal apparatus communicates with two base station apparatuses (transmission and/or reception points), assume that four layers of PDSCH are spatially multiplexed and transmitted from each of the base station apparatuses. In this case, the number of DMRS CDM groups without data is indicated to be 2 from one base station apparatus or the two base station apparatuses. However, since the number of spatial multiplexing of DMRS and the number of spatial multiplexing of PDSCH transmitted from each of the base station apparatuses are both 4, the power ratio of the DMRS and the PDSCH is 1 (0 dB), and thus the power ratio of the DMRS and the PDSCH need not be considered. Accordingly, the terminal apparatus needs to know (determine) whether or not to demodulate (decode) the PDSCH in consideration of the power ratio of the DMRS and the PDSCH. Note that in a case that the terminal apparatus communicates with multiple base station apparatuses (transmission and/or reception points), each of the base station apparatuses (transmission and/or reception points) may transmit by reducing the power of the PDSCH according to the number of DMRS CDM groups without data, but in this case, the reliability and the throughput will be reduced.

The base station apparatus can transmit, to the terminal apparatus, the power ratio of the DMRS and the PDSCH or information for indicating whether or not to demodulate (decode) the PDSCH in consideration of the power ratio of the DMRS and the PDSCH. In this case, the terminal apparatus can demodulate (decode) the PDSCH in accordance with the received power ratio of the DMRS and the PDSCH or information for indicating whether or not to demodulate (decode) the PDSCH in consideration of the power ratio of the DMRS and the PDSCH.

The terminal apparatus can also determine the power ratio of the DMRS and the PDSCH from the configuration of the DMRS port group. For example, suppose that, in the DMRS configuration type 1, the DMRS port group 1 is configured (associated) with the CDM group 0, in other words, the DMRS ports 1000, 1001, 1004, and 1005, and the DMRS port group 2 is configured (associated) with the CDM group 1, in other words, the DMRS ports 1002, 1003, 1006, and 1007. At this time, in a case that the DMRS antenna port numbers configured in the two DMRS port groups are indicated by the DCI, the terminal apparatus demodulates (decodes) the PDSCH as the power ratio of the DMRS and the PDSCH being 1 (0 dB), even in a case that the number of DMRS CDM groups without data is indicated to be 2. In a case that the DMRS antenna port number configured in only one DMRS port group are indicated by the DCI, the terminal apparatus demodulates (decodes) the PDSCH as the power ratio of the DMRS and the PDSCH being 1 (0 dB).

The terminal apparatus can also determine the power ratio of the DMRS and the PDSCH by the TCI. In a case that the received TCI is a configuration related to two DMRS port groups, the terminal apparatus demodulates (decodes) the PDSCH as the power ratio of the DMRS and the PDSCH being 1 (0 dB), even in a case that the number of DMRS CDM groups without data is 2 or 3. In other cases, the terminal apparatus determines the power ratio of the DMRS and the PDSCH according to the number of DMRS CDM groups without data.

An initial value of the DMRS sequence is calculated based on at least the NID and the SCID. The SCID is configured in up to two patterns and is indicated as 0 or 1. The NID is associated with the SCID and is configured by higher layer signaling. For example, the NID in a case of SCID=0 and the NID in a case of SCID=1 are configured. In a case that the NID or SCID is not configured, the SCID is 0 and the NID is a physical cell ID. The SCID is included in the DCI. The SCID may indicate whether or not to demodulate (decode) the PDSCH in consideration of the power ratio of the DMRS and the PDSCH. For example, in the case of SCID=0, the terminal apparatus demodulates (decodes) the PDSCH in consideration of the power ratio of the DMRS and the PDSCH according to the number of the DMRS CDM groups without data, and in the case of SCID=1, the terminal apparatus demodulates (decodes) the PDSCH without considering the power ratio of the DMRS and the PDSCH. The SCID and DMRS port groups may be associated with each other. For example, the sequence for the DMRS associated with the DMRS port group 1 is generated with SCID=0, and the sequence for the DMRS associated with the DMRS port group 2 is generated with SCID=1.

Note that in a case that multiple base station apparatuses (transmission and/or reception points) and terminal apparatuses communicate, and that each of the base station apparatuses transmits the PDCCH to the terminal apparatuses in the same slot, each of the base station apparatuses can spatially multiplexes different terminal apparatuses by MU-MIMO. For example, consider a case that the base station apparatus 3A transmits the PDCCH1 (DCI1) to the terminal apparatus 4A and the base station apparatus 5A transmits the PDCCH2 (DCI2) to the terminal apparatus 4A. Note that the PDCCH1 and the PDCCH2 are transmitted in the same slot. Although not illustrated, suppose that the base station apparatus 5A spatially multiplexes the terminal apparatus 4A and the terminal apparatus 4B. Assuming the DMRS configuration type 2, the base station apparatus 3A configures the DMRS ports 1000, 1001, 1006, and 1007 for the terminal apparatus 4A as the DMRS port group 1, and configures the DMRS ports 1002, 1003, 1008, and 1009 as the DMRS port group 2. The DMRS port numbers included in the DCI1 are 1000, 1001, 1006, and 1007, and the number of CDM groups without data is 2. The DMRS port numbers included in the DCI1 are 1002, 1003, 1008, and 1009, and the number of CDM groups without data is 3. At this time, the base station apparatus 5A communicates with the terminal apparatus 4B by using the DMRS port numbers 1004, 1005, 1010, and 1011. At this time, the terminal apparatus 4A can know that the DMRS of the DMRS port group 1 is indicated by the DCI1, and the DMRS of the DMRS port group 2 is indicated by DCI2. Therefore, since the two DMRS CDM groups without data indicated by the DCI1 are used for transmission addressed to the terminal apparatus itself, the power ratio of the DMRS DMRS ports 1000, 1001, 1006, and 1007 indicated by the DCI1 and the corresponding PDSCHs can be determined to be 1 (0 dB). Since two CDM groups without data of the three CDM groups without data indicated by the DCI2 are used for the transmission addressed to the apparatus itself, the power ratio of the DMRS ports 1002, 1003, 1008, and 1009 indicated by the DCI2 and the corresponding PDSCHs can be determined to be 2 (3 dB). In other words, in a case that the terminal apparatus receives two PDCCHs in the same slot, the terminal apparatus can determine the power ratio of the DMRS and the PDSCH, in consideration of the number resulting from subtraction of 1 from the number of DMRS CDM groups without data indicated by one of DCI.

Note that the frequency bands used by the communication apparatuses (base station apparatus and terminal apparatus) according to the present embodiment are not limited to the licensed bands and unlicensed bands described heretofore. Frequency bands to which the present embodiment is directed include frequency bands called white bands (white space) that are not actually used for the purpose of preventing interference between frequencies or the like although the permission of the use is given from a country or a region to specific services (for example, frequency bands that are not used depending on regions although assigned for television transmission use), or shared frequency bands (licensed shared bands) that have been exclusively assigned to particular operators, but are expected to be shared by multiple operators in the future.

A program running on an apparatus according to an aspect of the present invention may serve as a program that controls a Central Processing Unit (CPU) or the like to cause a computer to function in such a manner as to realize functions of an embodiment according to an aspect of the present invention. Programs or the information handled by the programs are temporarily stored in a volatile memory such as a Random Access Memory (RAM), a non-volatile memory such as a flash memory and a Hard Disk Drive (HDD), or any other storage apparatus system.

Note that a program for realizing functions of an embodiment according to an aspect of the present invention may be recorded in a computer-readable recording medium. This configuration may be realized by causing a computer system to read the program recorded on the recording medium for execution. It is assumed that the "computer system" refers to a computer system built into apparatuses, and the computer system includes an operating system or hardware components such as peripheral devices. The "computer-readable recording medium" may be any of a semiconductor recording medium, an optical recording medium, a magnetic recording medium, a medium dynamically retaining a program for a short time, or any other computer readable recording medium.

Each functional block or various characteristics of the apparatuses used in the above-described embodiments may be implemented or performed on an electric circuit, for example, an integrated circuit or multiple integrated circuits. An electric circuit designed to perform the functions described in the present specification may include a general-purpose processor, a digital signal processor (DSP), an application specific integrated circuit (ASIC), a field programmable gate array (FPGA), or other programmable logic devices, discrete gates or transistor logics, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. In a case that a circuit integration technology appears that replaces the present integrated circuits with advances in semiconductor technology, it is also possible to use a new integrated circuit based on the technology according to one or more aspects of the present invention.

Note that the invention of the present patent application is not limited to the above-described embodiments. In the embodiments, apparatuses have been described as examples, but the invention of the present application is not limited to these apparatuses, and is applicable to a terminal apparatus or a communication apparatus of a fixed-type or a stationary-type electronic apparatus installed indoors or outdoors, for example, an AV device, a kitchen device, a cleaning or washing machine, an air-conditioning device, office equipment, a vending machine, or other household devices.

The embodiments of the present invention have been described in detail above referring to the drawings, but the specific configurations are not limited to the embodiments, and include, for example, modifications to the designs that fall within the scope without departing from the gist of the present invention. Various modifications are possible within the scope of an aspect of the present invention defined by claims, and embodiments that are made by suitably combining technical means disclosed according to different embodiments are also included in the technical scope of the present invention. Configurations in which constituent elements, described in the respective embodiments and having mutually the same effects, are substituted for one another are also included in the technical scope of the present invention.

INDUSTRIAL APPLICABILITY

An aspect of the present invention can be preferably used in a base station apparatus, a terminal apparatus, and a communication method. An aspect of the present invention can be utilized, for example, in a communication system, a communication apparatus (for example, a cellular phone apparatus, a base station apparatus, a wireless LAN apparatus, or a sensor device), an integrated circuit (for example, a communication chip), or a program.

REFERENCE SIGNS LIST 1A, 3A, 5A, 7A, 9A Base station apparatus
2A, 4A, 6A Terminal apparatus
101 Higher layer processing unit
102 Controller
103 Transmitter
104 Receiver
105 Transmit and/or receive antenna
106 Measurement unit
1011 Radio resource control unit
1012 Scheduling unit
1031 Coding unit
1032 Modulation unit
1033 Downlink reference signal generation unit
1034 Multiplexing unit
1035 Radio transmitting unit
1041 Radio receiving unit
1042 Demultiplexing unit
1043 Demodulation unit
1044 Decoding unit
201 Higher layer processing unit
202 Controller
203 Transmitter
204 Receiver
205 Measurement unit
206 Transmit and/or receive antenna
2011 Radio resource control unit
2012 Scheduling information interpretation unit
2031 Coding unit
2032 Modulation unit
2033 Uplink reference signal generation unit
2034 Multiplexing unit
2035 Radio transmitting unit
2041 Radio receiving unit
2042 Demultiplexing unit
2043 Signal detection unit

The invention claimed is:

1. A terminal apparatus for communicating with a base station apparatus, the terminal apparatus comprising:
a receiver configured to receive a downlink shared channel, a downlink control information (DCI) and a demodulation reference signal (DMRS), wherein the DCI includes a scrambling identity (SCID) and indicates a set of DMRS code division multiplexing (CDM) groups; and
a signal detector configured to demodulate the downlink shared channel based on the DCI, wherein the signal detector calculates an initial value of a DMRS sequence based on a value of the SCID such that:
if the value of the SCID is 0, the signal detector demodulates the downlink shared channel in consideration of a power ratio of the DMRS and the downlink shared channel according to a number of DMRS CDM groups of the set without data; and
if the value of the SCID is 1, the signal detector demodulates the downlink shared channel without considering the power ratio of the DMRS and the downlink shared channel.

2. The terminal apparatus according to claim 1, wherein:

the signal detector further calculates the initial value based on an identifier configured by higher layer signaling;

the identifier is associated with the SCID; and the first DMRS antenna port group and the second antenna port group use different values of the identifier.

3. The terminal apparatus of claim 1, wherein the SCID and the set of DMRS CDM groups are associated with one another.

4. The terminal apparatus of claim 1, wherein:

the DCI further includes a transmit configuration indicator (TCI); and the signal detector is further configured to use the TCI to determine the power ratio of the DMRS and the downlink shared channel.

5. A communication method for a terminal apparatus for communicating with a base station apparatus, the communication method comprising:

receiving a downlink shared channel, a downlink control information (DCI) and a demodulation reference signal (DMRS), wherein the DCI includes a scrambling identity (SCID) and indicates a set of DMRS code division multiplexing (CDM) groups;

demodulating the downlink shared channel based on the DCI; and calculating an initial value of a DMRS sequence based on a value of the SCID such that:

if the value of the SCID is 0, the signal detector demodulates the downlink shared channel in consideration of a power ratio of the DMRS and the downlink shared channel according to a number of DMRS CDM groups of the set without data; and if the value of the SCID is 1, the signal detector demodulates the downlink shared channel without considering the power ratio of the DMRS and the downlink shared channel.

6. The communication method of claim 5, wherein:

the initial value is further calculated based on an identifier configured by higher layer signaling;

the identifier is associated with the SCID; and the first DMRS antenna port group and the second antenna port group use different values of the identifier.

7. The communication method of claim 5, wherein the SCID and the set of DMRS CDM groups are associated with one another.

8. The communication method of claim 5, wherein:

the DCI further includes a transmit configuration indicator (TCI); and the communication method further comprises determining the power ratio of the DMRS and the downlink shared channel using the TCI.

* * * * *